(12) United States Patent
Nakamura

(10) Patent No.: US 11,217,845 B2
(45) Date of Patent: Jan. 4, 2022

(54) BATTERY, BATTERY PACK, ELECTRONIC DEVICE, ELECTRIC VEHICLE, POWER STORAGE DEVICE, AND ELECTRIC POWER SYSTEM

(71) Applicant: MURATA MANUFACTURING CO., LTD., Kyoto (JP)

(72) Inventor: Toshikazu Nakamura, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 74 days.

(21) Appl. No.: 16/787,345

(22) Filed: Feb. 11, 2020

(65) Prior Publication Data

US 2020/0212377 A1 Jul. 2, 2020

Related U.S. Application Data

(63) Continuation of application No. PCT/JP2018/030357, filed on Aug. 15, 2018.

(30) Foreign Application Priority Data

Aug. 25, 2017 (JP) .............................. JP2017-162547

(51) Int. Cl.
*H01M 2/02* (2006.01)
*H01M 50/124* (2021.01)
(Continued)

(52) U.S. Cl.
CPC ..... *H01M 50/124* (2021.01); *H01M 10/0587* (2013.01); *H01M 50/10* (2021.01);
(Continued)

(58) Field of Classification Search
CPC ............. H01M 50/124; H01M 50/107; H01M 50/538; H01M 50/116; H01M 50/543;
(Continued)

(56) References Cited

U.S. PATENT DOCUMENTS

2003/0219649 A1* 11/2003 Shoji .................... H01M 50/116
429/176
2006/0083981 A1 4/2006 Mori et al.
(Continued)

FOREIGN PATENT DOCUMENTS

JP 2002231195 A 8/2002
JP 2003077448 A 3/2003
(Continued)

OTHER PUBLICATIONS

Japanese Office Action dated Jan. 26, 2021 in corresponding Japanese Application No. 2019-537579.
(Continued)

*Primary Examiner* — Jane J Rhee
(74) *Attorney, Agent, or Firm* — K&L Gates LLP

(57) ABSTRACT

A battery includes a can that includes a base material including iron and a nickel layer provided on a surface of the base material, an electrode element accommodated in the can, an insulating plate provided between the electrode element and a bottom of the can, and a metal-containing material provided between the insulating plate and the bottom of the can. An oxidation-reduction potential of the metal-containing material in a non-aqueous electrolytic solution is 1.5 V (vsLi/Li$^+$) or higher an lower than 3.25 V (vsLi/Li$^+$).

20 Claims, 9 Drawing Sheets

(51) Int. Cl.
*H01M 10/0587* (2010.01)
*H01M 50/10* (2021.01)
*H01M 50/107* (2021.01)
*H01M 50/116* (2021.01)
*H01M 50/538* (2021.01)
*H01M 50/543* (2021.01)
*H01M 4/02* (2006.01)

(52) U.S. Cl.
CPC ....... *H01M 50/107* (2021.01); *H01M 50/116* (2021.01); *H01M 50/538* (2021.01); *H01M 50/543* (2021.01); *H01M 2004/027* (2013.01)

(58) Field of Classification Search
CPC ............. H01M 50/10; H01M 10/0587; H01M 2004/027

See application file for complete search history.

(56) References Cited

U.S. PATENT DOCUMENTS

2009/0311595 A1* 12/2009 Mori .................... H01M 50/116
429/174
2017/0149049 A1* 5/2017 Endoh .................. H01M 4/366

FOREIGN PATENT DOCUMENTS

| JP | 2004103554 A | 4/2004 |
| JP | 2005078894 A | 3/2005 |
| JP | 2007042526 A | 2/2007 |
| JP | 2008041527 A | 2/2008 |
| JP | 2010238462 A | 10/2010 |
| JP | 2017103029 A | 6/2017 |
| JP | 2018073488 A | 5/2018 |

OTHER PUBLICATIONS

International Search Report for Application No. PCT/JP2018/030357, dated Oct. 16, 2018.
Japanese Office Action dated Jul. 6, 2021 in corresponding Japanese Application No. 2019-537579.

* cited by examiner

BATTERY, BATTERY PACK, ELECTRONIC DEVICE, ELECTRIC VEHICLE, POWER STORAGE DEVICE, AND ELECTRIC POWER SYSTEM

CROSS REFERENCE TO RELATED APPLICATIONS

The present application is a continuation of PCT patent application no. PCT/JP2018/030357, filed on Aug. 15, 2018, which claims priority to Japanese patent application no. JP2017-162547 filed on Aug. 25, 2017, the entire contents of which are being incorporated herein by reference.

BACKGROUND

The present disclosure generally relates to a battery, a battery pack, an electronic device, an electric vehicle, a power storage device, and an electric power system.

Some non-aqueous electrolyte secondary batteries include a bottomed can obtained by plating, with nickel, a base material containing iron (Fe) as a main component, and have a configuration in which the can is electrically connected to a negative electrode. in the non-aqueous electrolyte secondary battery having such a configuration, when the battery is overdischarged to a voltage of about 0 V, a negative single electrode potential is higher than a potential of the iron contained in the base material of the can. For this reason, with a crack, chip, or pinhole in the nickel plating, the iron may be eluted from a part having the crack, chip, or pinhole, which ay cause pitting corrosion of the can, leading to liquid leakage.

In addition, when the battery is exposed to a high temperature, such as 45° C. or 60° C., the elution of iron from the can tends to become more prominent. Therefore, considering the environmental temperature for actual use of the battery in an electronic device, such elution is a phenomenon of great concern.

Furthermore, when the battery is charged after being overdischarged to a voltage of about 0 V, dissolved ions of can material that has been already dissolved and other metals are deposited on a surface or end of the electrode as the negative electrode potential decreases due to charging of the battery. Such deposition reduces an electrode reaction area, hinders normal electrode reaction, and therefore may deteriorate battery characteristics. In addition, when a metal such as iron, or lithium is deposited on the electrode, there is a risk of a short circuit between the positive and negative electrodes.

SUMMARY

The present disclosure generally relates to a battery, a battery pack, an electronic device, an electric vehicle, a power storage device, and an electric power system.

An object of the present disclosure is to provide a battery that can suppress dissolution of a can when overdischarged to a voltage of about 0 V and can also suppress deterioration of battery characteristics during charge and discharge after the overdischarge, and a battery pack, an electronic device, an electric vehicle, a power storage device, and an electric power system that include the battery.

According to an embodiment of the present disclosure, a battery is provided. The battery includes a can that includes a base material including iron and a nickel layer provided on a surface of the base material, an electrode element accommodated in the can, an insulating plate provided between the electrode element and a bottom of the can, and a metal-containing material provided between the insulating plate and the bottom of the can. An oxidation-reduction potential of the metal-containing material in a non-aqueous electrolytic solution is 1.5 V (vsLi/Li$^+$) or higher and lower than 3.25 V (vsLi/Li$^+$).

A battery pack, an electronic device, an electric vehicle, a power storage device, and an electric power system according to the present disclosure include the battery as described herein.

According to the present disclosure, dissolution of a can can be suppressed when a battery is overdischarged to a voltage of about 0 V and deterioration of battery characteristics can be also suppressed during charge and discharge after the overdischarge.

It should be understood that the effects described herein are not limited, but may be a of or different from the effects described in the present disclosure.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
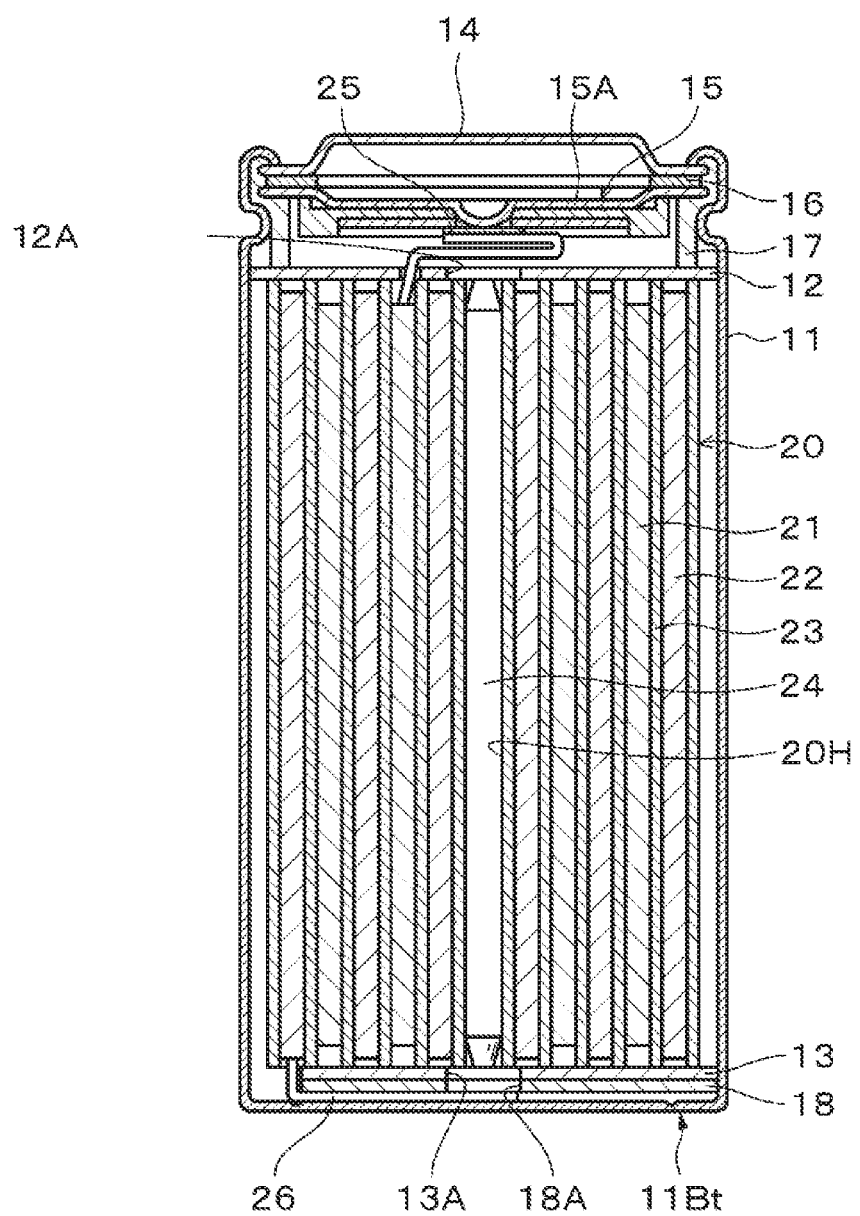
FIG. 1 is a cross-sectional view showing an example of a configuration of a non-aqueous electrolyte secondary battery according to an embodiment of the present disclosure.

An example of a configuration of a non-aqueous electrolyte secondary battery (hereinafter, simply referred to as "battery") according to one embodiment of the present disclosure will be described below with reference to FIG. 1. This battery is, for example, a general lithium ion secondary battery in which a capacity of a negative electrode is represented by a capacity component determined by occlusion and release of lithium (Li) as an electrode reactant. This battery, which is generally called a cylindrical type, has a substantially hollow cylindrical shape, and includes a battery can 11 having a bottom and an electrode element 20 having a substantially cylindrical shape and being housed in the battery can 11.

The electrode element 20 includes a pair of positive electrode 21 and negative electrode 22 and a separator 23 that are strip-shaped. The positive electrode 21 and the negative electrode 22 are laminated with a separator 23 interposed therebetween and wound in a longitudinal direction. A non-aqueous electrolytic solution as an electrolytic solution is injected into the battery can 11, and the positive electrode 21, the negative electrode 22, and the separator 23 are impregnated with the non-aqueous electrolytic solution.

This battery includes an insulating plate 12 disposed at one end of the electrode element 20 so as to be perpendicular to a circumferential surface of the electrode element 20, and an insulating plate 13 and a metal-containing material 18 disposed at the other end of the electrode element 20 so as to be perpendicular to the circumferential surface of the electrode element 20. The electrode element 20 is housed in the battery can 11, such that the other end at which the insulating plate 13 and the metal-containing material 18 are disposed faces a can bottom 11Bt. Therefore, the insulating plate 13 and the metal-containing material 18 are disposed between the electrode element 20 and the can bottom 11Bt of the battery can 11. Of the insulating plate 13 and the metal-containing material 18, the insulating plate 13 is disposed on the other end of the electrode element 20, and the metal-containing material 18 is disposed at the can bottom 11Bt. Hereinafter, of both ends of the battery, a side near the can bottom 11Bt may be referred to as "bottom side", and an opposite side of the bottom side may be referred to as "top side".

This battery is provided, at an open end of the battery can 11, with a battery lid 14, and a safety valve mechanism 15 and a thermosensitive resistance element (Positive Temperature Coefficient; PTC element) 16 that are disposed inside the battery lid 14. The battery lid 14, the safety valve mechanisms 15 and the thermosensitive resistance element 16 are attached by crimping with a sealing gasket 17 interposed therebetween. This configuration allows the inside of the battery can 11 to be hermetically sealed. The battery lid 14 includes, for example, a material similar to a material of the battery can 11. When gas is generated in the battery can 11 at a time of abnormality, the safety valve mechanism 15 discharges the gas from the top side of the battery by cleaving or the like. Further, the safety valve mechanism 15 is electrically connected to the battery lid 14. When an internal pressure of the battery is equal to or higher than a certain level due to internal short circuit or external heating, a disk plate 15A is inverted to disconnect the electrical connection between the battery lid 14 and the electrode element 20. The sealing gasket 17 includes, for example, an insulating material, and asphalt is applied to a surface of the sealing gasket 17.

The electrode element 20 has a center hole 20H that penetrates from a center of one end surface toward a center of the other end surface of the electrode element 20. A center pin 24 is inserted into the center hole 20H. The center pin 24 has a cylindrical shape with both ends open. Thus, when the gas is generated in the battery can 11, the center pin 24 functions as a flow path that guides the gas from the bottom side to the top side. Note that the electrode element 20 may not have the center pin 24.

A positive electrode lead 25 is connected to the positive electrode 21 of the electrode element 20, such that one end of the positive electrode lead 25 comes out from one end of the electrode element 20. The one end of the positive electrode lead 25 is electrically connected to the battery lid 14 by welding or the like to the safety valve mechanism 15. Meanwhile, a negative electrode lead 26 is connected to the negative electrode 22, such that one end of the negative electrode lead 26 comes out from the electrode element 20. Then, a portion of the negative electrode lead 26 extended from the electrode element 20 is sandwiched between the metal-containing material 18 and the can bottom 11Bt, and the one end of the negative electrode lead 26 is electrically connected to the can bottom 11Bt by welding or the like.

Hereinafter, descriptions will be given one by one about the battery can 11, the positive electrode lead 25, the negative electrode lead 26, the insulating plates 12 and 13, the metal-containing material 18, the positive electrode 21, the negative electrode 22, the separator 23, and the non-aqueous electrolytic solution, configuring the battery according to one embodiment.

Figure 2A:
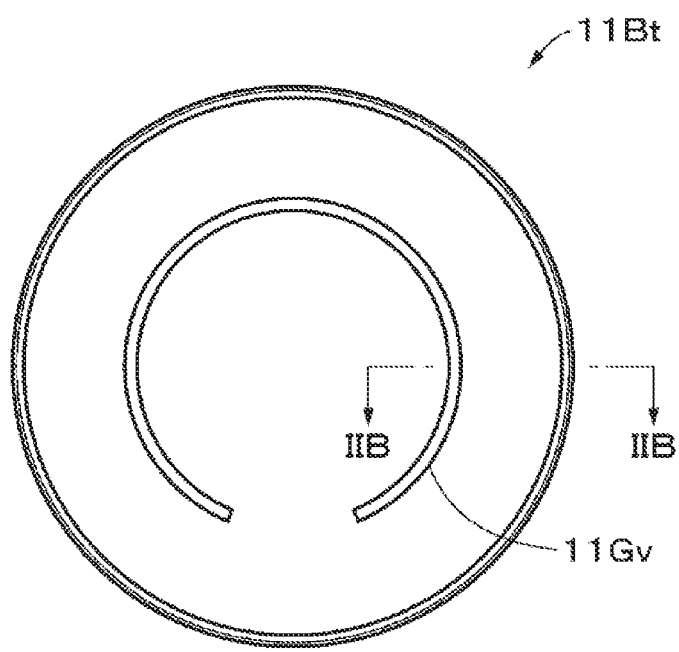
FIG. 2A is a plan view showing an example of a can bottom having an arc-shaped groove according to an embodiment of the present disclosure.
Figure 2B:
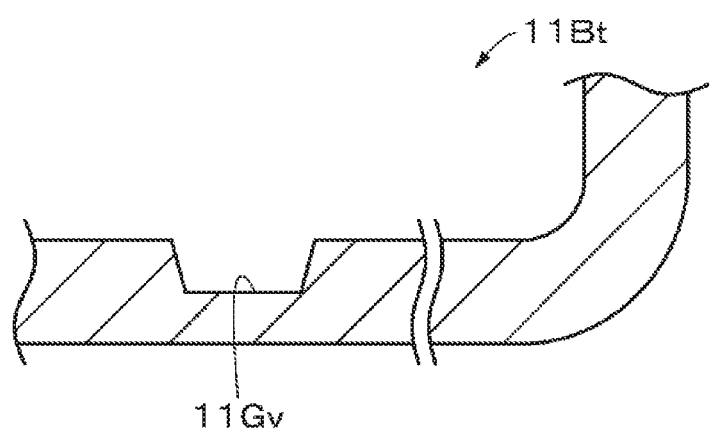
FIG. 2B is a cross-sectional view taken along line IIB-IB of FIG. 2A according to an embodiment of the present disclosure.

The battery can 1 has a base material containing iron as a main component and a nickel layer provided on a surface of the base material. The can bottom 11Bt has a circular shape as shown in FIG. 2A when viewed from a direction perpendicular to the can bottom 11Bt. Of both surfaces of the can bottom 11Bt, a surface that is inside of the battery can 11 (hereinafter simply referred to as "inner surface of the can bottom 11Bt") has one groove 11Gv as a cleavage valve (safety mechanism) as shown in FIGS. 2A and 2B. The groove 11Gv is an example of a thin portion in which a thickness of a part of the can bottom 11Bt is thinner than a thickness of the other parts. Since the can bottom 11Bt has the groove 11Gv, when gas pressure at the bottom side of the battery increases abnormally, the groove 11Gv of the can bottom 11Bt is cleaved to let the gas escape outside. Thus, this improves safety of the battery.

The groove 11Gv has an arc shape, such as a C shape or an inverted C shape. A center of the arc of the groove 11Gv preferably coincides with the center of the can bottom 11Bt. That is, the arc of the groove 11Gv is preferably concentric with an outer circumference of the can bottom 11Bt. FIG. 2A shows an example in which one groove 11Gv having an arc shape is provided in the can bottom 11Bt. However, the number of the groove 11Gv is not limited to one, but two or more grooves 11Gv having an arc shape may be provided in the can bottom 11Bt.

A gas release pressure (cleavage pressure) of the groove 11Gv is preferably higher than a gas release pressure (working pressure) of the safety valve mechanism 15. Since the groove 11Gv of the can bottom 11Bt is intended to release the gas to outside of the battery when abnormal heat is applied to the battery in an overcharged state or the like, the cleavage of the groove 11Gv is preferably suppressed in normal use. The gas release pressure of the groove 11Gv is preferably lower than an internal pressure of the battery at which a sealing portion of the battery in the overcharged state or the like is broken. This is because, when abnormal heat is applied to the battery in the overcharged state or the like, the groove 11Gv can be cleaved and the gas can be discharged outside the battery before the battery bursts. Specifically, the gas release pressure of the groove 11Gv is preferably in a range of 20 kgf/cm$^2$ or higher and 100 kgf/cm$^2$ or lower.

A cross-sectional shape of the groove 11Gv is, for example, a substantially polygonal shape, a substantially partial circular shape, a substantially partial elliptical shape, or an indefinite shape, but is not limited to these shapes. A curvature R or the like may be given to a top of the polygonal shape. Examples of the polygonal shape include a triangular shape, a quadrangular shape, such as a trapezoidal shape and a rectangular shape, and a pentagonal shape. Here, the "partial circular shape" is a partial shape of a circular shape, for example, a semicircular shape. The partial elliptical shape is a partial shape of an elliptical shape, for example, a semi-elliptical shape. When the groove 11Gv has a bottom surface, the bottom surface may be, for example, a flat surface, an irregular surface having a step, a curved surface having undulations, or a composite surface in which two or more of these surfaces are combined.

The positive electrode lead 25 contains, for example, at least one of aluminum (Al) and an aluminum alloy. The negative electrode lead 26 contains, for example, at least one of nickel (Ni), copper (Cu), a nickel alloy, and a copper alloy. The negative electrode lead 26 may be a plated material whose surface is plated or a clad material to which dissimilar metals are joined. Examples of the clad material include a clad material in which two kinds of metals among nickel, copper, a nickel alloy, or a copper alloy are joined.

The insulating plates 12 and 13 have disk shapes having through holes 12A and 13A in the center, respectively. The insulating plates 12 and 13 include at least one material of, for example, a thermoplastic resin, a nonwoven fabric, and ceramics, the material having an electrical insulating property. The insulating plate 12 is disposed at the one end of the electrode element 20, such that the through hole 12 A overlaps the center hole 20H. The insulating plate 13 is disposed at the other end of the electrode element 20, such that the through hole 13A overlaps the center hole 20H.

The metal-containing material 18 has a disk shape having a through hole 18A in a center The insulating plate 13 and the metal-containing material 18 overlap each other, such that the through hole 18A of the metal-containing material 18 and the through hole 13A of the insulating plate 13 overlap each other. The metal-containing material 18 is provided not as the negative electrode lead 26 but as a member other than the negative electrode lead 26. The one end of the negative electrode lead 26 is provided so as to overlap the through holes 13A and 18A. The can bottom 11Bt and the metal-containing material 18 may be in contact with each other by pressure-welding or may be connected to each other by welding.

An oxidation-reduction potential of the metal-containing material 18 in the non-aqueous electrolytic solution is 1.5 V (vsLi/Li$^+$) or higher and lower than 3.25 V (vsLi/Li$^+$). The metal-containing material preferably contains at least one of zinc (Zn), tin (Sn), silicon (Si), and sulfur (S) and particularly preferably contains zinc among these metals. From a viewpoint of improvement of battery productivity, the metal-containing material 18 is preferably bonded to the insulating plate 13.

A thickness of the metal-containing material 18 is preferably 1 μm or more and 5000 μm or less, more preferably 5 μm or more and 5000 μm or less, and even more preferably 10 μm or more and 5000 μm or less. When the thickness of the metal-containing material 18 is less than 1 μm, the metal-containing material 18 having a foil shape may be difficult to form and handle. Further, when the metal-containing material 18 is formed on the insulating plate 13 by electrolytic plating, a portion hidden by surface irregularities of the insulating plate 13 is enlarged, general pinholes are generated in a wide range, and dissolving function as a sacrificial anode may be deteriorated. On the other hand, when the thickness of the metal-containing material 18 exceeds 5000 μm, it may be difficult to manufacture the metal-containing material 18 by punching.

The metal-containing material 18 is preferably bonded to the insulating plate 13 by pressure-welding, adhesion, fusion, or the like. Examples of adhesives used for the adhesion include rubber-based pressure-sensitive adhesives, such as isoprene, styrene-butadiene, and silicone, fluorine-based pressure-sensitive adhesives, and paraffin-based resins having pressure-sensitive adhesiveness or adhesiveness.

The shape of the metal-containing material 18 is, for example, a plate shape, a foil shape, a thin film shape, a mesh shape, a block shape, or a powder form, but is not limited to these shapes. Two or more of the metal-containing materials 18 having a plate shape, a foil shape, a thin film shape, a mesh shape, a block shape, or a powder form may be used in combination. When the metal-containing material 18 has a plate shape, a foil shape, a mesh shape, or the like, two or more metal-containing materials 18 may be overlapped.

When the metal-containing material 18 has a powder form, the metal-containing material 18 may be sintered, or bound by a binder. Further, when the metal-containing material has a powder form, particles may be supported by a binding agent or the like on a main surface on a side facing the can bottom 11Bt, of both main surfaces of the insulating plate 13, or the particles may be embedded in the main surface, such that part of the particles are exposed.

When the metal-containing material 18 has a thin film shape, a thin film may be formed directly on the main surface on the side facing the can bottom 11Bt, of both main surfaces of the insulating plate 13. Examples of a method of forming the thin film include, but are not limited to a sputtering method, a chemical vapor deposition (CVD) method, and a vacuum deposition method.

Figure 3:
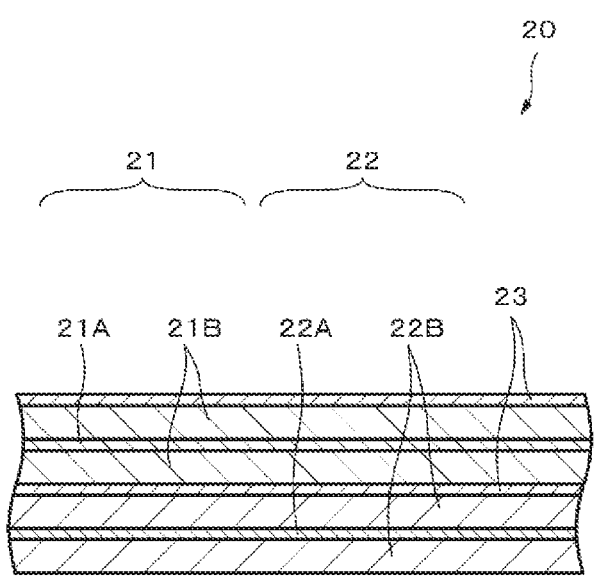
FIG. 3 is a partially enlarged cross-sectional view of an electrode element shown in FIG. 1.

As shown in FIG. 3, the positive electrode 21 includes a positive electrode current collector 21A and positive electrode active material layers 21B provided on both surfaces of the positive electrode current collector 21A. The positive electrode current collector 21A includes, for example, metal foil such as aluminum foil, nickel foil, or stainless steel foil. The positive electrode active layer 21B includes, for example, a positive electrode active material capable of occluding and releasing lithium as an electrode reactant, and a binder. The positive electrode active material layer 21B may further include a conductive agent, if necessary.

As the positive electrode active material capable of occluding and releasing lithium, for example, a lithium-containing compound such as a lithium oxide, a lithium phosphorus oxide, and a lithium sulfide, and an intercalation compound containing lithium are suitable, and two or more of the above may be used in mixture. In order to increase an energy density, a lithium-containing compound that contains lithium, a transition metal element, and oxygen (O) is preferred. Examples of the lithium-containing compound include a lithium composite oxide having a layered rock salt type structure shown in formula (A) and a lithium composite phosphate having an olivine type structure shown in formula (B). The lithium-containing compound more preferably contains at least one element selected from the group consisting of cobalt (Co), nickel, manganese (Mn), and iron as the transition metal element. Examples of the lithium-containing compound include a lithium composite oxide that has a layered rock salt type structure as represented by formula (C), (D), or (E), a lithium composite oxide that has a spinel type structure as represented by formula (F), and a lithium composite phosphate that has an olivine type structure represented by formula (G), and specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qM1_rO_{(2-y)}X_z \quad (A)$$

(In the formula (A), M1 represents at least one element selected from Groups 2 to 15 elements excluding nickel and manganese. X represents at least one element selected from Groups 16 and 17 elements excluding oxygen. Values of p, q, y, and z are within ranges of 0≤p≤1.5, 0≤q≤0, 0≤r≤1.0, −0.10≤y≤0.20, and 0≤z≤0.2.)

$$Li_aM2_bPO_4 \quad (B)$$

(In the formula (B), M2 represents at least one element selected from Groups 2 to 15 elements. Values of a and b are within ranges of 0<a<2.0 and 0.5<b<2.0.)

$$Li_jMn_{(1-g-h)}Ni_gM3_hO_{(2-j)}F_k \quad (C)$$

(In the formula (C), M3 represents at least one element selected from the group consisting of cobalt, magnesium (Mg), aluminum, boron (B), titanium (Ti), vanadium (V), chromium (Cr), iron, copper, zinc, zirconium (Zr), molybdenum (Mo), tin, calcium (Ca), strontium (Sr), and tungsten (W). Values of f, g, h, j, and k are within ranges of 0.8≤f≤1.2, 0≤g≤0.5, 0≤h≤0.5, g+h≤1, −0.1≤j≤0.2, and 0<k≤0.1. Note that the composition of lithium varies depending on the charge and discharge state, and the value of f indicates a value in a full discharge state.)

$$Li_mNi_{(1-n)}M4_nO_{(2-p)}F_q \quad (D)$$

(In the formula (D), M4 represents at least one element selected from the group consisting of cobalt, manganese, magnesium, aluminum, boron, titanium, vanadium, chromium, iron, copper, zinc, molybdenum, tin, calcium, strontium, and tungsten. Values of m, n, p, and q are within ranges of 0.8≤m≤1.2, 0.005≤n≤0.5, −0.1≤p≤0.2, and 0≤q≤0.1. Note that the composition of lithium varies depending on the charge and discharge state, and the value of m indicates the value in the full discharge state.)

$$Li_rCo_{(1-s)}M5_sO_{(2-t)}F_u \quad (E)$$

(In the formula (E), M5 represents at least one element selected from the group consisting of nickel, manganese, magnesium, aluminum, boron, titanium, vanadium, chromium, iron, copper, zinc, molybdenum, tin, calcium, strontium, and tungsten. Values of r, s, t, and u are within ranges of 0.8≤r≤1.2, 0≤s≤0.5, −0.1≤t≤0.2, and 0≤u≤0.1. Note that the composition of lithium varies depending on the charge and discharge state, and the value of r indicates the value in the full discharge state.)

$$Li_vMn_{2-w}M6_wO_xF_y \quad (F)$$

(In the formula (F), M6 represents at least one element selected from the group consisting of cobalt, nickel, magnesium, aluminum, boron, titanium, vanadium, chromium, iron, copper, zinc, molybdenum, tin, calcium, strontium, and tungsten. Values of v, w, x, and y are within ranges of 0.9≤v≤1.1, 0≤w≤0.6, 3.7≤x≤4.1, and 0≤y≤0.1. Note that the composition of lithium varies depending on the charge and discharge state, and the value of v indicates the value in the full discharge state.)

$$Li_zM7PO_4 \quad (G)$$

(In the formula (G), M7 represents at least one element selected from the group consisting of cobalt, manganese, iron, nickel, magnesium, aluminum, boron, titanium, vanadium, niobium (Nb), copper, zinc, molybdenum, calcium, strontium, tungsten, and zirconium. A value of z is within a range of 0.9≤z≤1.1. Note that the composition of lithium varies depending on the charge and discharge state, and the value of z indicates the value in the full discharge state.)

Other examples of the positive electrode active material capable of occluding and releasing lithium include inorganic compounds without any lithium, such as $MnO_2$, $V_2O_5$, $V_6O_{13}$, NiS, and MoS.

The positive electrode active material capable of occluding and releasing lithium may be other than the above. Further, two or more of the positive electrode active materials exemplified above may be mixed in arbitrary combination.

For example, at least one selected from resin materials, such as polyvinylidene fluoride (PVH), polytetrafluoroethylene (PTFE), polyacrylonitrile (PAN), styrene butadiene rubber (SBR), and carboxymethyl cellulose (CMC), and copolymers mainly of the above resin materials is used as the binder.

Examples of the conductive agent include carbon materials, such as graphite, carbon fibers, carbon black, Ketjen black, or carbon nanotubes, and one of these materials may be used alone, or in a mixture of two or more. In addition to the carbon materials, a metal material, a conductive polymer material, or the like may be used as long as the material has conductivity.

As shown in FIG. 3, the negative electrode 22 includes a negative electrode current collector 22A and negative electrode active material layers 22B provided on both surfaces of the negative electrode current collector 22A. The negative electrode active material layers 22B and the positive electrode active material layers 21B are each disposed to face each other. The negative electrode current collector 22A includes, for example, metal foil, such as copper foil, nickel foil, or stainless steel foil. The negative electrode active material layer 22B includes a negative electrode active material capable of occluding and releasing lithium. The negative electrode active material layer 22B may further include the conductive agent, if necessary.

In the battery, it is preferable that electrochemical equivalent of the negative electrode or the negative electrode active material is larger than electrochemical equivalent of the positive electrode 21, and theoretically, a lithium metal is not deposited on the negative electrode 22 during charging.

Examples of the negative electrode active material include carbon materials, such as non-graphitizable carbon, graphitizable carbon, graphite, pyrolytic carbons, cokes, glassy carbons, an organic polymer compound fired body, carbon fibers, and activated carbon. Among the above materials, examples of the cokes include pitch coke, needle coke, and petroleum coke. The term "organic polymer compound fired body" refers to a product carbonized by firing a polymer material, such as a phenol resin or a furan resin, at an appropriate temperature. Some of the products are classified as non-graphitizable carbon or graphitizable carbon. These carbon materials are preferable because very little change occurs in a crystal structure generated during charging and discharging, a high charge and discharge capacity can be obtained, and good cycle characteristics can be obtained. In particular, graphite is preferable because graphite has large electrochemical equivalent and a high energy density can be obtained. Further, non-graphitizable carbon is preferable because excellent cycle characteristics can be obtained. Furthermore, a carbon material having a low charge and discharge potential, specifically a carbon material having a charge and discharge potential close to that of lithium metal is preferable because a high energy density of the battery is easily achieved.

Further, examples of other negative electrode active materials capable of increasing the capacity include materials containing at least one of a metal element and a metalloid element as a constituent element (for example, an alloy, a compound, or a mixture). This is because a high energy density can be achieved with use of such a material. In particular, the use of such a material in combination with a carbon material is more preferable because a high energy density and excellent cycle characteristics can be obtained at the same time. Note that, in the present disclosure, in addition to alloys containing two or more metal elements, examples of the alloy include alloys containing one or more metal elements and one or more metalloid elements. Further, the alloy may include a non-metal element. A compositional structure of the alloy includes a solid solution, a eutectic (eutectic mixture), an intermetallic compound, and a material in which two or more of the above coexist.

Examples of the negative electrode active material include a metal element and a metalloid element capable of forming an alloy with lithium. Specifically, the examples include magnesium, boron, aluminum, titanium, gallium (Ga), indium (In), silicon, germanium (Ge), tin, lead (Pb), bismuth (Bi), cadmium (Cd), silver (Ag), zinc, hafnium (Hf), zirconium, yttrium (Y), palladium (Pd), and platinum (Pt). These metal and metalloid elements may be crystalline or amorphous.

As the negative electrode active material, a material including, as a constituent element, a metal element or a metalloid element of Group 4B in the short periodic table is preferable, and more preferable is a material including at least one of silicon and tin as a constituent element. This is because silicon and tin have a large capacity to occlude and release lithium, and thus a high energy density can be obtained. Examples of the negative electrode active material include a simple substance, an alloy, or a compound of silicon, a simple substance, an alloy, or a compound of tin, and a material that at least partially has a phase of one or two, or more of the above.

Examples of the alloy of silicon include, as a second constituent element other than silicon, an alloy containing at least one element selected from the group consisting of tin, nickel, copper, iron, cobalt, manganese, zinc, indium, silver, titanium, germanium, bismuth, antimony (Sb), and chromium. Examples of the alloy of tin include, as a second constituent element other than tin, an alloy containing at least one element selected from the group consisting of silicon, nickel, copper, iron, cobalt, manganese, zinc, indium, silver, titanium, germanium, bismuth, antimony, and chromium.

Examples of the compound of tin or the compound of silicon include a compound containing oxygen or carbon, and such a compound may contain the second constituent element described above in addition to tin or silicon.

Above all, a SnCoC-containing material that contains cobalt, tin, and carbon as constituent elements, has carbon content of 9.9 mass % or more and 29.7 mass % or less, and has a proportion of cobalt content to a total content of tin and cobalt of 30 mass % or more and 70 mass % or less is preferable as the Sn-based negative electrode active material. This is because a high energy density and excellent cycle characteristics can be obtained in such composition ranges.

This SnCoC-containing material may further contain other constituent elements, if necessary. The other constituent elements are preferably, for example, silicon, iron, nickel, chromium, indium, niobium, germanium, titanium, molybdenum, aluminum, phosphorus (P), gallium, or bismuth, and two or more of the above may be contained. This is because the capacity or the cycle characteristics can be further improved.

It should be understood that the SnCoC-containing material has a phase containing tin, cobalt, and carbon, and this phase preferably has a structure having a low crystallinity or being amorphous. Further, in the SnCoC-containing material, carbon as a constituent element is preferably at least partially bonded to a metal element or a metalloid element as another constituent element. It is considered that deterioration of the cycle characteristics is caused by aggregation or crystallization of tin or the like. Such aggregation or crystallization can be suppressed by carbon bonded to another element.

Examples of a measurement method of examining the bonding state of elements include X-ray photoelectron spectroscopy (XPS). In the XPS, in a case of graphite, a peak of 1s orbit of carbon (C1s) appears at 284.5 eV in an energy-calibrated apparatus, such that a peak of 4f orbit of a gold atom (Au4f) is obtained at 84.0 eV: Further, in a case of surface contaminated carbon, a peak appears at 284.8 eV. In contrast, when a charge density of carbon element is high, for example, when carbon is bonded to a metal element or a metalloid element, the peak of C1s appears in a region lower than 284.5 eV. That is, when a peak of a combined wave of C1s obtained on the SnCoC-containing material appears in the region lower than 284.5 eV, carbon contained in the SnCoC-containing material is at least partially bonded to a metal element or a metalloid element as another constituent element.

It should be understood that, in the XPS measurement, the peak of C1s, for example, is used to correct an energy axis of a spectrum. In general, since surface contaminated carbon is present on the surface, the peak of C1s of the surface contaminated carbon is set at 284.8 eV, which is used as an energy reference. In the XPS measurement, a waveform of the peak of C1s is obtained as a form including the peak of the surface contaminated carbon and the peak of the carbon in the SnCoC-containing material. Thus, the peak of the surface contaminated carbon and the peak of the carbon in the SnCoC-containing material are separated by, for example, analysis using commercially available software. In the analysis of the waveform, a position of a main peak present on the lowest binding energy side is used as the energy reference (284.8 eV).

Examples of other negative electrode active materials include a metal oxide and a polymer compound capable of occluding and releasing lithium. Examples of the metal oxide include lithium titanium oxide containing titanium and lithium, such as lithium titanate ($Li_4Ti_5O_{12}$), iron oxide, ruthenium oxide, and molybdenum oxide. Examples of the polymer compound include polyacetylene, polyaniline, and polypyrrole.

As the binder, for example, at least one selected from resin materials, such as polyvinylidene fluoride, polytetrafluoroethylene, polyacrylonitrile, styrene butadiene rubber, and carboxymethyl cellulose, and copolymers mainly of the above resin materials is used.

Examples of the conductive agent include carbon materials, such as graphite, carbon fibers, carbon black, Ketjen black, or carbon nanotubes, and one of these materials may be used alone, or in a mixture of two or more. In addition to the carbon materials, a metal material, a conductive polymer material, or the like may be used as long as the material has conductivity.

The separator 23 separates the positive electrode 21 and the negative electrode 22 from each other to prevent a short circuit of a current due to a contact between both electrodes, and thereby allows lithium ions to pass. The separator 23 is configured by a porous membrane made of a resin, such as polytetrafluoroethylene, polypropylene, or polyethylene, and may have a structure in which two or more of these porous membranes are laminated. Above all, the polyolefin porous membrane is preferable because the membrane has an excellent effect to prevent a short circuit and the safety of the battery can be enhanced by a shutdown effect. In particular, polyethylene is preferred as a material configuring the separator 23, because the shutdown effect within a range of 100° C. or higher and 160° C., or lower can be obtained, and also excellent electrochemical stability can be achieved. In addition, a material obtained by copolymerizing or blending a resin having chemical stability with polyethylene or polypropylene can be used. Alternatively, the porous membrane may have a structure of three or more layers in which a polypropylene layer, a polyethylene layer, and a polypropylene layer are sequentially laminated.

The separator 23 may be configured to include a substrate and a surface layer provided on one or both surfaces of the substrate. The surface layer includes inorganic particles that have electrical insulation properties, and a resin material that binds the inorganic particles to the surface of the substrate and binds the inorganic particles to each other. The resin material may have, for example, a three-dimensional network structure in which fibrillation is caused and the fibrils are continuously connected to each other. The inorganic particles are supported on the resin material having the three-dimensional network structure, and thereby the particles can maintain a dispersed state without being connected to each other. Further, the resin material may bind the inorganic particles to the surface of the substrate or may bind the inorganic particles to each other without being fibrillated. In this case, it is possible to obtain a much higher binding ability. The surface layer is provided on the one or both surfaces of the substrate as described above, thereby making it possible to impart oxidation resistance, heat resistance, and mechanical strength to the substrate.

The substrate is a porous layer having porosity. More specifically, the substrate is a porous membrane configured by an insulating film having high ion permeability and a predetermined mechanical strength, and the electrolytic solution is held in the pores of the substrate. The substrate preferably has a predetermined mechanical strength as a main part of the separator 23, and also preferably has characteristics such as high resistance to the electrolytic solution, low reactivity, and difficulty in expansion.

As the resin material configuring the substrate, for example, a polyolefin resin such as polypropylene or polyethylene, an acrylic resin, a styrene resin, a polyester resin, a nylon resin or the like is preferably used. In particular, polyethylene such as low density polyethylene, high density polyethylene, and linear polyethylene, low molecular weight wax of such polyethylene, or a polyolefin resin such as polypropylene has an appropriate melting temperature and is readily available, and thus can be suitably used. Further, a structure obtained by laminating two or more kinds of porous membranes, or a porous membrane formed by melting and kneading two or more kinds of resin materials may be used. The substrate including a porous membrane made of a polyolefin resin has excellent separability between the positive electrode 21 and the negative electrode 22 and can further reduce the internal short circuit.

A nonwoven fabric may be used as the substrate. Aramid fibers, glass fibers, polyolefin fibers, polyethylene terephthalate (PET) fibers, nylon fibers, or the like can be used as fibers configuring the nonwoven fabric. Alternatively, two or more of these fibers may be mixed to form the nonwoven fabric.

The inorganic particles include at least one of a metal oxide, a metal nitride, a metal carbide, and a metal sulfide. Aluminum oxide (alumina, $Al_2O_3$), boehinite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) or the like can be suitably used as the metal oxide. Silicon nitride ($Si_3N_4$), aluminum nitride (AlN), boron nitride (BN), titanium nitride (TiN) or the like can be suitably used as the metal nitride. Silicon carbide (SiC), boron carbide (B4C) or the like can be suitably used as the metal carbide. Barium sulfate ($BaSO_4$) or the like can be suitably used as the metal sulfide. Further, porous aluminosilicate such as zeolite ($M_{2/n}O \cdot Al_2O_3 \cdot xSiO_2 \cdot yH_2O$, M are metal elements, $x \geq 2$, $y \geq 0$), layered silicate, or a mineral such as barium titanate ($BaTiO_3$) or strontium titanate ($SrTiO_3$) may be used. Above all, alumina, titania (in particular, having a rutile type stricture), silica, or magnesia is preferably used, and alumina is more preferably used. The inorganic particles have oxidation resistance and heat resistance, and the surface layer on a side facing the positive electrode containing the inorganic particles has strong resistance to an oxidizing environment near the positive electrode at the time of charging. A shape of the inorganic particles is not particularly limited, and any of spherical, plate-like, fibrous, cubic, and random shapes can be used.

Examples of the resin material configuring the surface layer include fluorine-containing resins such as polyvinylidene fluoride and polytetrafluoroethylene, fluorine-containing rubbers such as vinylidene fluoride-tetrafluoroethylene copolymers and ethylene-tetrafluoroethylene copolymers, styrene-butadiene copolymers or hydrogenated products thereof, acrylonitrile-butadiene copolymers or hydrogenated products thereof, acrylonitrile-butadiene-styrene copolymers or hydrogenated product thereof, methacrylic acid ester-acrylic acid ester copolymers, styrene-acrylic acid ester copolymers, acrylonitrile-acrylic acid ester copolymers, rubbers such as ethylene propylene rubbers, polyvinyl alcohol, and polyvinyl acetate, cellulose derivatives such as ethyl cellulose, methyl cellulose, hydroxyethyl cellulose, and carboxymethyl cellulose, polyphenylene ether, polysulfone, polyethersulfone, polyphenylene sulfide, polyether imide, polyimide, polyamides such as wholly aromatic polyamide (aramid), resins that have high heat resistance such that at least one of a melting point and a glass transition temperature is 180° C. or higher, such as polyamideimide, polyacrylonitrile, polyvinyl alcohol, polyether, acrylic acid resins, or polyester. These resin materials may be used alone, or in a mixture of two or more. Above all, fluorine-based resins such as polyvinylidene fluoride are preferable from a viewpoint of oxidation resistance and flexibility, and aramid or polyamideimide is preferably included from a viewpoint of heat resistance.

A particle size of the inorganic particles is preferably in a range of 1 nm or more and 10 μm or less. With the particle size of smaller than 1 nm, the inorganic particles are hard to obtain, and it is not cost-effective even when the inorganic particles are obtained. On the other hand, with the particle size of larger than 10 μm, a distance between the electrodes is increased, a filling amount of an active material is not sufficiently obtained in a limited space, and thus the battery capacity is decreased.

As a method of forming the surface layer, for example, a method can be used in which a slurry composed of a matrix resin, a solvent, and an inorganic substance is applied onto the substrate (porous membrane), passed through a poor solvent of the matrix resin and a good solvent bath of the solvent to cause phase separation, and then dried.

Note that the inorganic particles described above may be included in the porous membrane as the substrate. Further, the surface layer may not include the inorganic particles and may be made only of a resin material.

The separator 23 is impregnated with an electrolytic solution that is a liquid electrolyte. The electrolytic solution includes a solvent and an electrolyte salt dissolved in the solvent. In order to improve the battery characteristics, the electrolytic solution may include a known additive.

As the solvent, a cyclic carbonate ester such as ethylene carbonate or propylene carbonate can be used, and it is preferable to use one of ethylene carbonate and propylene carbonate, and particularly preferable to use both of these in mixture. This is because the cycle characteristics can be improved.

As the solvent, in addition to the above cyclic carbonate esters, it is preferable to use a chain carbonate ester such as diethyl carbonate, dimethyl carbonate, ethyl methyl carbonate, or methyl propyl carbonate in mixture. This is because high ionic conductivity can be obtained.

The solvent preferably further contains 2,4-difluoroanisole or vinylene carbonate. This is because 2,4-difluoroanisole can improve a discharge capacity, and vinylene carbonate can improve the cycle characteristics. Thus, use of these compounds in mixture is preferable because the discharge capacity and the cycle characteristics can be improved.

In addition to the above, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxypropionitrile, N,N-dimethylformamide, N-methylpyrrolidinone, N-methyloxazolidinone, N,N-dimethyl imidazolidinone, nitrornethane, nitroethane, sulfolane, dimethylsulfoxide, and trimethyl phosphate.

A compound obtained by replacing at least a part of hydrogen of these non-aqueous solvents with fluorine may be preferable because such a compound may improve reversibility of electrode reaction depending on the types of electrodes to be combined.

Examples of the electrolyte salt include lithium salts, which may be used alone, or in a mixture of two or more. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, and LiBr. Above all, $LiPF_6$ is preferable because $LiPF_6$ can achieve high ionic conductivity and improve the cycle characteristics.

The positive electrode potential (vsLi/Li$^+$) in a fully charged state is, from a viewpoint of enhancing an energy density, preferably 4.30 V or higher, more preferably 4.35 V or higher, still more preferably 4.40 V or higher, and particularly preferably 4.45 V or higher. However, the positive electrode potential (vsLi/Li$^+$) in the fully charged state may be 4.2 V or higher or 4.25 V or higher. An upper limit of the positive electrode potential (vsLi/Li$^+$) in the fully charged state is not particularly limited, but is preferably 6.00 V or lower, more preferably 4.60 V or lower, and still more preferably 4.50 V or lower.

When the battery having the above-mentioned configuration is charged, for example, lithium ions are released from the positive electrode active material layer 21B, and occluded in the negative electrode active material layer 22B via the electrolytic solution. Further, when the battery is discharged, for example, lithium ions are released from the negative electrode active material layer 22B, and occluded in the positive electrode active material layer 21B via the electrolytic solution.

Next, an example of the method of producing the battery according to one embodiment of the present disclosure will be described.

The positive electrode 21 is manufactured as follows. First, for example, a positive electrode mixture is prepared by mixing a positive electrode active material, a conductive agent, and a binding agent. This positive electrode mixture is then dispersed in a solvent such as N-methyl-2-pyrrolidone (NMP) to manufacture a positive electrode mixture slurry in a paste-like form. Next, the positive electrode mixture slurry is applied to both surfaces of the positive electrode current collector 21A, such that the positive electrode current collector 21A is partially exposed. Then, the solvent is dried, and the positive electrode active material layers 21B are formed by compression-molding by a roll press machine or the like. Thus, the positive electrode 21 in which the positive electrode current collector 21A is partially exposed from the positive electrode active material layers 21B is manufactured.

The negative electrode 22 is manufactured as follows. First, for example, a negative electrode mixture is prepared by mixing a negative electrode active material and a binding agent, and this negative electrode mixture is dispersed in a solvent such as N-methyl-2-pyrrolidone to manufacture a negative electrode mixture slurry in a paste-like form. Next, the negative electrode mixture slurry is applied to both surfaces of the negative electrode current collector 22A, such that the negative electrode current collector 22A is partially exposed. Then, the solvent is dried, and the negative electrode active material layers 22B are formed by compression-molding by a roll press machine or the like. Thus, the negative electrode 22 in which the negative electrode current collector 22A are partially exposed from the negative electrode active material layers 22B is manufactured.

The battery is assembled as follows. First, the positive electrode lead 25 is attached, by welding or the like, to a portion where the positive electrode current collector 21A is exposed, and the negative electrode lead 26 is attached, by welding or the like, to a portion where the negative electrode current collector 22A is exposed. Next, the electrode element 20 is manufactured by winding the positive electrode 21 and the negative electrode 22 in a longitudinal direction with the separator 23 interposed therebetween. Subsequently, the insulating plates 12 and 13 and the metal-containing material 18 in a plate shape, a foil shape, or the like are prepared, and the metal-containing material 18 is bonded to one main surface of the insulating plate 13 to form a laminated plate. After that, the insulating plate 1 is disposed at one end of the electrode element 20, the laminated plate is disposed at the other end, and then the electrode element 20 is housed in the battery can 11. At this time, the other end side of the electrode element 20 on which the laminated plate is disposed is the can bottom 11Bt side of the battery can, and one end of the negative electrode lead 26 overlaps the through hole of the laminated plate (the insulating plate 13 and the metal-containing material 18).

Next, a welding rod is inserted into the center hole 20H of the electrode element 20, a tip of the welding rod is inserted into the through hole of the laminated plate, and one end of the negative electrode lead 26 is pressed against the can bottom 11Bt with the welding rod and welded. Further, the positive electrode lead 25 is welded to the safety valve mechanism 15. Then, the center pin 24 is inserted into the center hole 20 H of the electrode element 20.

After that, grooving (beading) is performed on the open end of the battery can 11, thereby forming a constriction for crimping the safety valve mechanism 15, the thermosensitive resistance element 16, and the battery lid 14. Next, after the non-aqueous electrolytic solution is injected into the battery can 11 in which the electrode element 20 is housed, the safety valve mechanism 15, the thermosensitive resistance element 16, and the battery lid 14 are inserted into the open end of the battery can 11. The open end of the battery can 11 is fixed by crimping with the sealing gasket 17 interposed therebetween. The metal-containing material 18 and the can bottom 11Bt are pressure-welded to each other by the pressure applied to the electrode element 20 during the crimping. Thus, the battery shown in FIG. 1 is obtained.

The battery according to one embodiment includes the battery can 11 having a bottom and including the base material containing iron as a main component and the nickel layer provided on the surface of the base material, an electrode element 20 housed in the battery can 11, the insulating plate 13 provided between the electrode element 20 and the can bottom 11Bt of the battery can 11, and the metal-containing material 18 provided between the insulating plate 13 and the can bottom 11Bt of the battery can 11. The oxidation-reduction potential of the metal-containing material 18 in the non-aqueous electrolytic solution is 1.5 V (vsLi/Li$^+$) or higher and lower than 3.25 V (vsLi/Li$^+$). As a result, when the battery is overdischarged to a voltage of about 0 V, the metal-containing material 18 provided between the insulating plate 13 and the can bottom 11Bt is dissolved instead of the battery can 11, and this can suppress dissolution of the battery can 11 itself. Therefore, the occurrence of liquid leakage can be suppressed.

In one embodiment, a region in which the metal ions eluted from the metal-containing material 18 diffuse during overdischarge to a voltage of about 0 V is substantially limited to a region between the insulating plate 13 and the can bottom 11Bt. Thus, even when the metal ions are deposited during the charge after the overdischarge, a deposition site of the metal ions is substantially limited to the can bottom 11Bt. Therefore, it is possible to suppress a decrease in charge and discharge characteristics (for example, capacity retention rate) due to a phenomenon that the above-mentioned ions are deposited on a surface or an end of the negative electrode 22 and the electrode reaction area is decreased. In addition, by suppressing the deposition of the ions on the surface or the end of the negative electrode 22, it is possible to suppress the occurrence of an internal short circuit between the positive electrode 21 and the negative electrode 22. Thus, the deterioration of the battery characteristics can be suppressed even during the charge and discharge after the overdischarge.

In the conventional batteries, when a C-shaped groove or the like is provided as a cleavage valve (safety mechanism) on the can bottom of the battery can, a portion provided with the groove is particularly easily dissolved. This is because the groove is formed, in general, by pressing or the like, a crack is generated at the portion where the groove is provided, and the base material (Fe) is easily exposed. Moreover, since the portion where the groove is provided is thin, there is a high possibility of liquid leakage due to a progress of dissolution. On the other hand, in the battery according to one embodiment, the metal-containing material 18 provided between the insulating plate 13 and the can bottom 11Bt as described above is dissolved instead of the battery can 11, and this can suppress dissolution of a portion where the groove 11Gv is provided. Therefore, the occurrence of liquid leakage can be suppressed.

In the conventional battery, the negative electrode lead is dissolved instead of the battery can at the time of overdischarge to a voltage near 0 V, and thereby a welded portion of the negative electrode lead is dissolved, Thus, there is a risk that a welding strength decreases, and a vibration and shock resistance of the battery is deteriorated. On the other hand, in the battery according to one embodiment, not the negative electrode lead 26 but the metal-containing material 18 is dissolved instead of the battery can 11. Thus, a decrease in the welding strength of the negative electrode lead 26 can be suppressed. Therefore, a decrease in the vibration and shock resistance of the battery can be suppressed.

Figure 4:
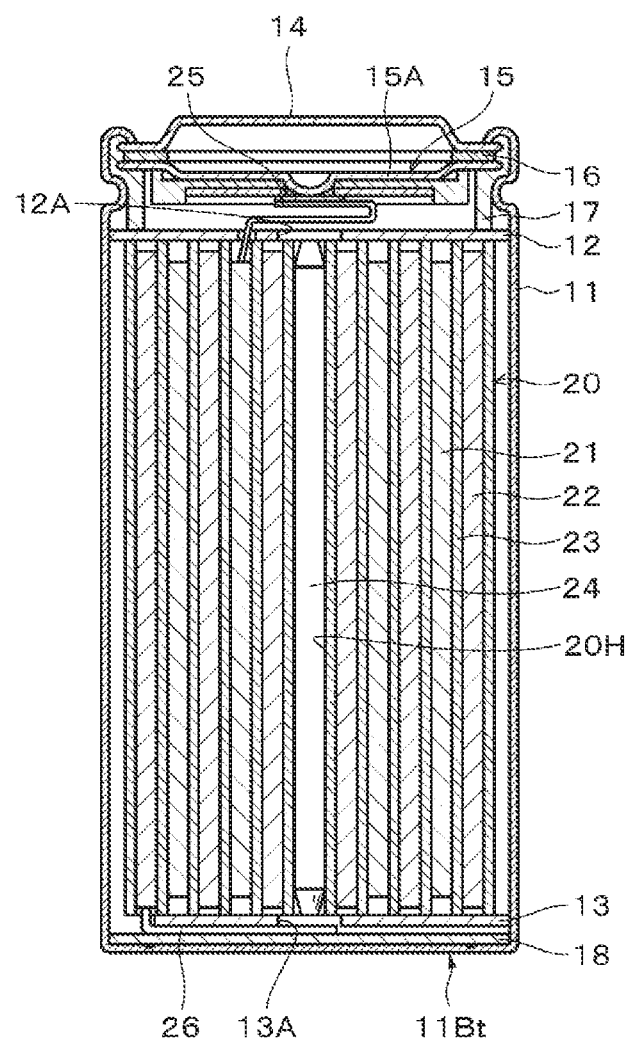
FIG. 4 is a cross-sectional view showing an example: of a configuration of a non-aqueous electrolyte secondary battery according to an embodiment of the present disclosure.

As shown in FIG. 4, a portion of the negative electrode lead 26 coming out from the other end side of the electrode element 20 may be sandwiched between the insulating plate 13 and the metal-containing material 18. In this case, the metal-containing material 18 does not have the through hole 18 A (see FIG. 1), and a tip of a portion coming out from the other end side of the electrode element 20 is disposed so as to overlap the through hole 13A, and connected to the metal-containing material 18 by welding or the like. Further, the can bottom 11Bt and the metal-containing material 18 may be in contact with each other by pressure-welding or may be connected to each other by welding.

Figure 5:
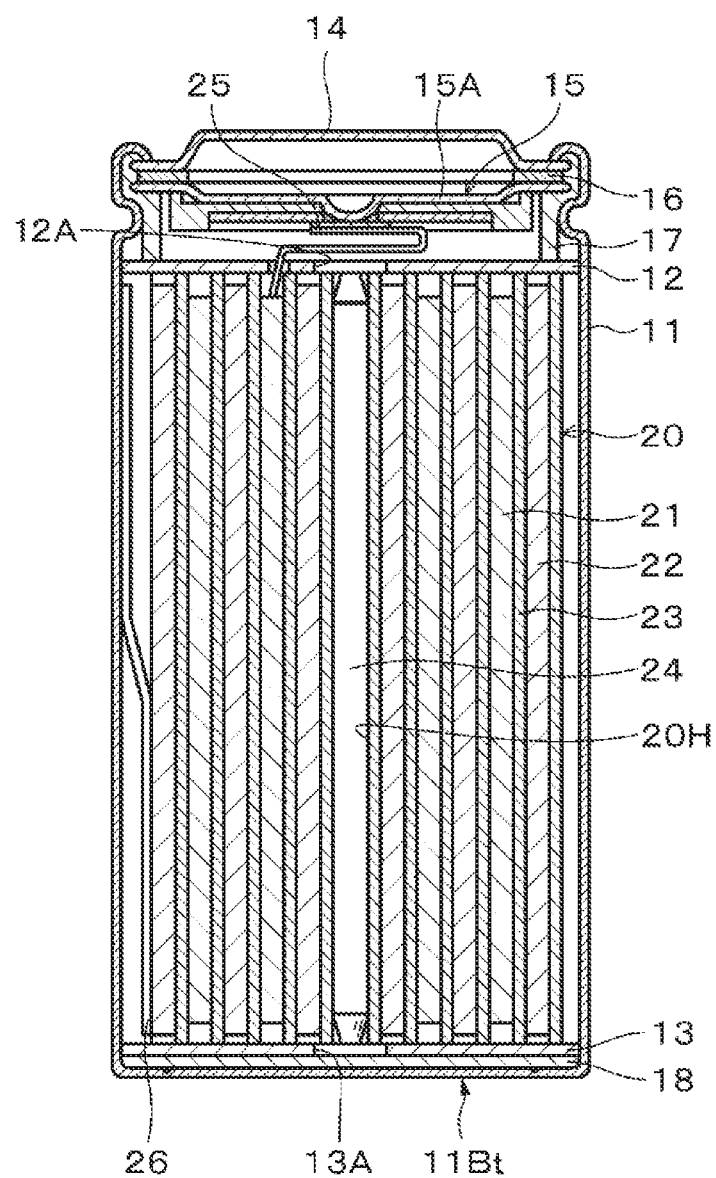
FIG. 5 is a cross-sectional view showing an example of a configuration of a non-aqueous electrolyte secondary battery according to an embodiment of the present disclosure.

As shown in FIG. 5, the negative electrode lead 26 provided on a side surface of the electrode element 20 may be connected to an inner surface of a circumferential wall of the battery can 11. In this case, the can bottom 11Bt and the metal-containing material 18 may be in contact with each other by pressure-welding or may be connected to each other by welding. Further, the metal-containing material 18 may not have the through hole 18A (see FIG. 1). Further, the insulating plate 13 and the metal-containing material 18 may be in close contact with each other, or the metal-containing material 18 and the can bottom 11Bt may be in close contact with each other.

The can bottom 11Bt may not have the groove 11Gv. However, from a viewpoint of improving safety, the can bottom 11Bt preferably has the groove 11Gv as in the above-described one embodiment.

In the above-described one embodiment, the case where the battery is cylindrical has been described. However, the shape of the battery is not particularly limited, and may be a square or the like.

In Application Example 1, a battery pack and an electronic device that include a battery according to a second or third embodiment will be described.

Figure 6:
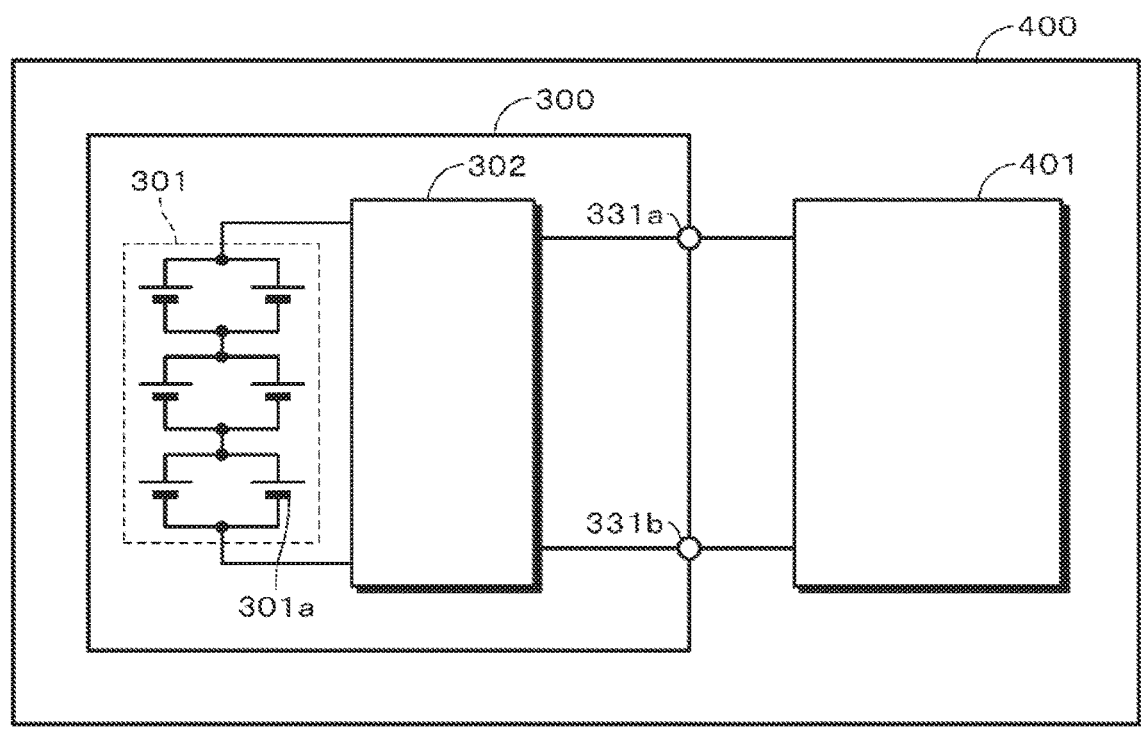
FIG. 6 is a block diagram showing an example of a configuration of an electronic device as an application example according to an embodiment of the present disclosure.

A configuration example of a battery pack 300 and an electronic device 400 as an application example will be described below with reference to FIG. 6. The electronic device 400 includes an electronic circuit 401 of an electronic device main body, and a battery pack 300. The battery pack 300 is electrically connected to the electronic circuit 401 via a positive electrode terminal 331$a$ and a negative electrode terminal 331$b$. For example, the electronic device 400 has a configuration that allows a user to detachably attach the battery pack 300. The configuration of the electronic device 400 is not limited to this configuration. The electronic device 400 may have a configuration in which the battery pack 300 is built in the electronic device 400, such that the user cannot remove the battery pack 300 from the electronic device 400.

At the time of charging the battery pack 300, the positive electrode terminal 331a and the negative electrode terminal 331b of the battery pack 300 are connected to a positive electrode terminal and a negative electrode terminal of a charger (not shown), respectively. On the other hand, at the time of discharging battery pack 300 (at the time of use of the electronic device 400), the positive electrode terminal 331a and the negative electrode terminal 331b of the battery pack 300 are connected to the positive electrode terminal and the negative electrode terminal of the electronic circuit 401, respectively.

Examples of the electronic device 400 include, but not limited to, laptop computers, tablet computers, mobile phones (e.g., smartphones), portable information terminals (Personal Digital Assistants: PDA), display devices LCD, EL displays, and electronic paper), imaging devices (e.g., digital still cameras, and digital video cameras), audio instruments (e.g., portable audio players), game machines, cordless phone handsets, electronic books, electronic dictionaries, radios, headphones, navigation systems, memory cards, pacemakers, headng aids, electric tools, electric shavers, refrigerators, air conditioners, television receivers, stereos, water heaters, microwave ovens, dishwashers, washing machines, dryers, lighting devices, toys, medical devices, robots, road conditioners, and traffic lights.

The electronic circuit 401 includes, for example, a CPU, a peripheral logic unit, an interface unit, a storage unit, and the like, and controls the entire electronic device 400.

The battery pack 300 includes an assembled battery 301 and a charge and discharge circuit 302. The assembled battery 301 is configured by connecting a plurality of secondary batteries 301a in series and/or in parallel. The plurality of secondary batteries 301a is connected, for example, in the form of n in parallel and m in series (n and m are positive integers). In FIG. 6, an example is shown in which six secondary batteries 301a are connected in the form of two in parallel and three in series (2P3S). As the secondary battery 301a, the battery according to the second or third embodiment is used.

A case where the battery pack 300 includes the assembled battery 301 configured by the plurality of secondary batteries 301a is described herein. However, a configuration may be adopted where the battery pack 300 includes one secondary battery 301a instead of the assembled battery 301.

The charge and discharge circuit 302 is a control unit that controls charging and discharging of the assembled battery 301. Specifically, the charge and discharge circuit 302 controls charging of the assembled battery 301 during charging. On the other hand, the charge and discharge circuit 302 controls discharging of the electronic device 400 during discharging (i.e., during use of the electronic device 400).

Figure 7:
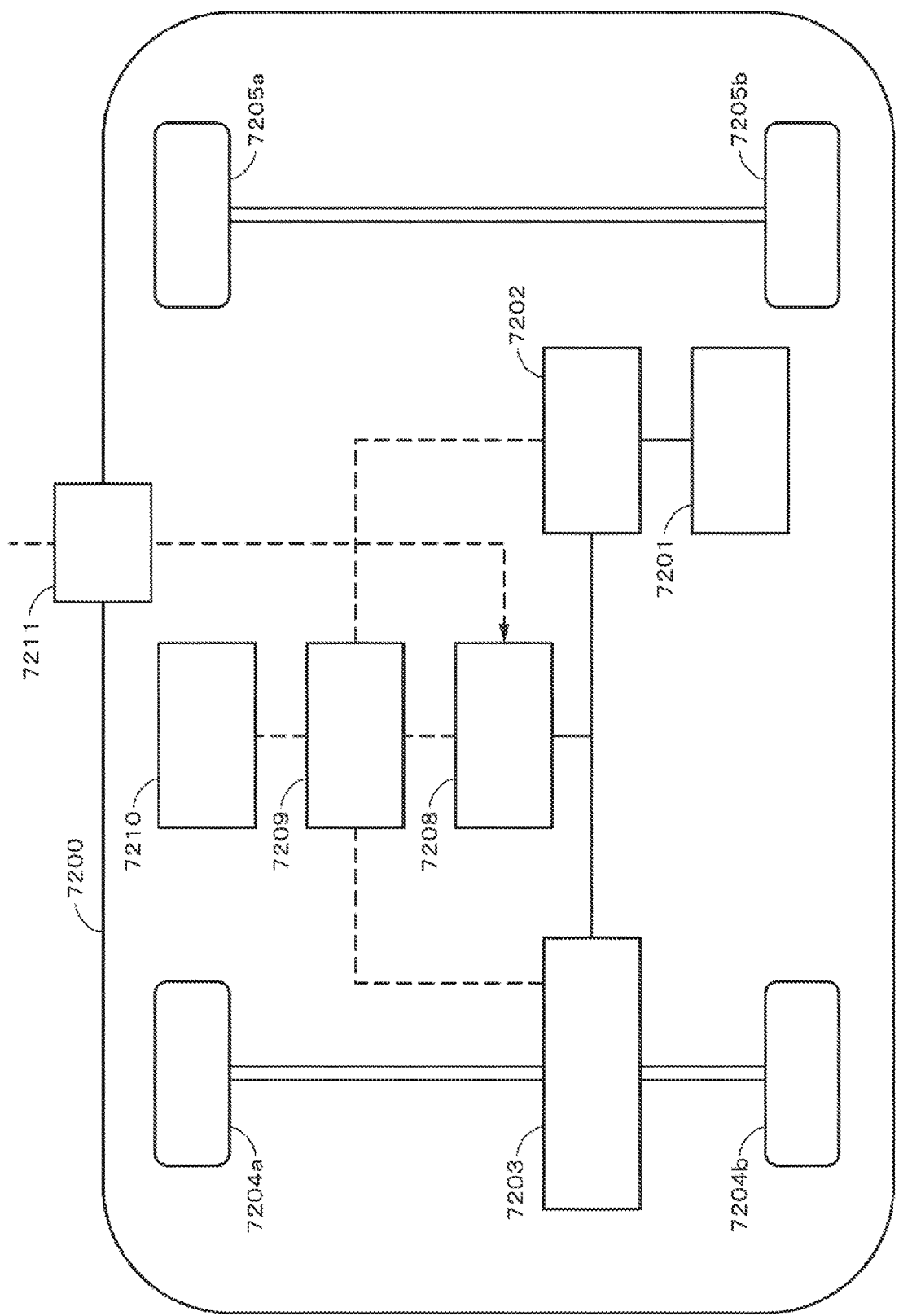
FIG. 7 is a schematic diagram showing an example of a configuration of a vehicle as an application example according to an embodiment of the present disclosure.

An example of applying the present disclosure to a power storage system for a vehicle will be described with reference to FIG. 7. FIG. 7 schematically shows an example of a configuration of a hybrid vehicle that adopts a series hybrid system to which the present disclosure is applied. The series hybrid system is a vehicle that runs by an electric power driving force conversion device by using electric power generated by a power generator driven by an engine or electric power temporarily stored in a battery.

In the hybrid vehicle 7200, an engine 7201, a power generator 7202, the electric power driving force conversion device (converter) 7203, a driving wheel 7204a, a driving wheel 7204b, a wheel 7205a, a wheel 7205b, a battery 7208, a vehicle control device (controller) 7209, various sensors 7210, and a charging port 7211 are mounted. The above-described power storage device according to the present disclosure is applied to the battery 7208.

The hybrid vehicle 7200 runs by using the electric power driving force conversion device 7203 as a power source. An example of the electric power driving force conversion device 7203 is a motor. The electric power driving force conversion device 7203 is operated by the electric power of the battery 7208, and a rotational force of the electric power driving force conversion device 7203 is transmitted to the driving wheels 7204a and 7204b. Direct current-alternating current (DC-AC) conversion or reverse conversion (AC-DC conversion) is used for a necessary portion, whereby the electric power driving force conversion device 7203 can be applied to either an AC motor or a DC motor. The various sensors 7210 control an engine speed via the vehicle control device 7209 and control an opening (throttle opening) of a throttle valve (not shown). The various sensors 7210 include a speed sensor, an acceleration sensor, an engine speed sensor, and the like.

The rotational force of the engine 7201 is transmitted to the power generator 7202, and the electric power generated by the power generator 7202 through the rotational force can be stored in the battery 7208.

When the hybrid vehicle decelerates by a braking mechanism (not shown), the resistance force at the time of deceleration is applied to the electric power driving force conversion device 7203 as a rotational force. Then, regenerative power generated by the electric power driving force conversion device 7203 through the rotational force is stored in the battery 7208.

The battery 7208 is connected to a power source outside the hybrid vehicle, and thereby the battery can receive power supply from the external power source by using the charging port 7211 as an input port and store the received electric power.

Although not shown, the hybrid vehicle may include an information processing device that performs information processing related to vehicle control, based on information on the secondary battery. Examples of the information processing device include an information processing device for displaying a remaining battery capacity based on information on the remaining capacity of the battery.

The above has been described with an example of the series hybrid car that runs by the motor by using electric power generated by the power generator driven by the engine or electric power temporarily stored in the battery. However, the present disclosure can be also effectively applied to a parallel hybrid vehicle that uses outputs of both an engine and a motor as a driving source, and appropriately switches three systems of running only by the engine, running only by the motor, and running by the engine and the motor. Furthermore, the present disclosure can be also effectively applied to a general electric vehicle that runs only by the driving motor without using the engine.

An example of the hybrid vehicle 7200 to which the technique according to the present disclosure can be applied has been described above. The technique according to the present disclosure can be suitably applied to the battery 7208 in the configuration described above.

Figure 8:
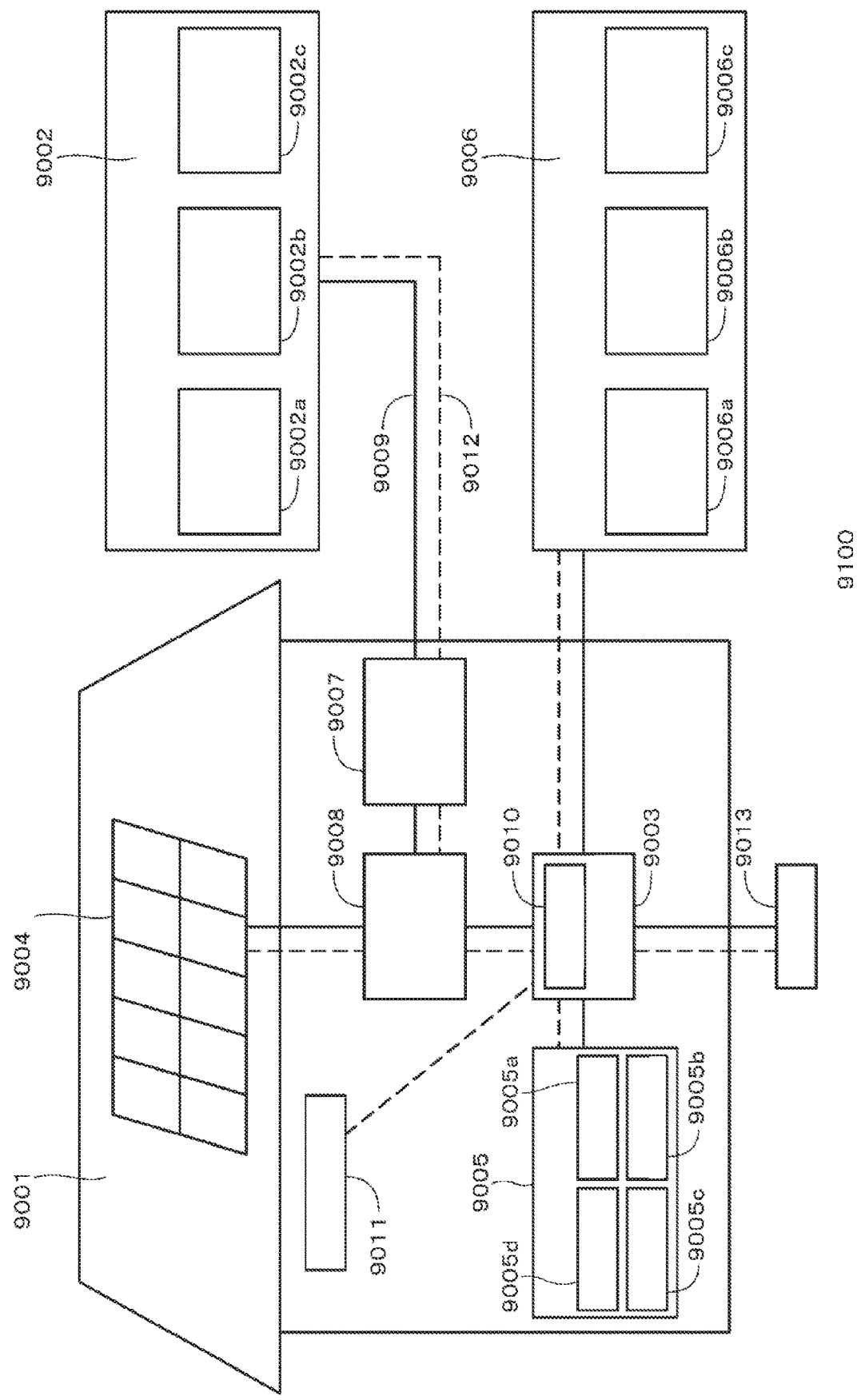
FIG. 8 is a schematic diagram showing an example of a configuration of a power storage system as an application example according to an embodiment of the present disclosure.

An example of applying the present disclosure to a power storage system for a house will be described with reference to FIG. 8. For example, in a power storage system 9100 for a house 9001, electric power is supplied to a power storage device 9003 from a centralized power system 9002 such as a thermal power generation 9002a, a nuclear power generation 9002b, and a hydraulic power generation 9002c via an electric power network 9009, an information network 9012, a smart meter 9007, a power hub 9008, and the like. At the same time, electric power is supplied from an independent power source such as a domestic power generation device 9004 to the power storage device 9003. The electric power supplied to the power storage device 9003 is stored. Electric power to be used in the house 9001 is supplied using the power storage device 9003. A similar power storage system can be used not only for the house 9001 but also for a building.

The house 9001 is provided with the domestic power generation device 9004, a power consumption device 9005, the power storage device 9003, a control device 9010 that controls the respective devices, the smart meter 9007, and various sensors 9011 that acquires various information. The respective devices are connected by the electric power network 9009 and the information network 9012. A solar cell, a fuel cell, or the like is used as the domestic power generation device 9004, and the generated electric power is supplied to the power consumption device 9005 and/or the power storage device 9003. The power consumption device 9005 is a refrigerator 9005a, an air conditioner 9005b, a television receiver 9005c, a bath 9005d, or the like. Further, the power consumption device 9005 includes an electric vehicle 9006. The electric vehicle 9006 is an electric car 9006a, a hybrid car 9006b, an electric motorcycle 9006c, or the like.

The above-described battery according to the present disclosure is applied to the power storage device 9003. The power storage device 9003 is configured by a secondary battery or a capacitor. The power storage device is configured by, for example, a lithium ion battery. The lithium ion battery may be stationary or may be used in the electric vehicle 9006. The smart meter 9007 is provided with a function of measuring a commercial power consumption and transmitting the measured consumption to an electric power company. The electric power network 9009 may be any one or a combination of DC power feed, AC power feed, and non-contact power feed.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. Based on the information from the various sensors 9011, a weather condition, a human condition, and the like are grasped and the power consumption device 9005 can be automatically controlled to minimize energy consumption. Further, the control device 9010 can transmit the information on the house 9001 to an external electric power company or the like via the Internet.

The power hub 9008 performs processing such as branching of power lines and DC/AC conversion. Examples of a communication method of the information network 9012 connected to the control device 9010 include a method of using a communication interface, such as universal synchronous receiver-transmitter (UART: asynchronous serial communication transmitter/receiver circuit), and a method of using a sensor network by a wireless communication standard such as Bluetooth (registered trademark), ZigBee (registered trademark), or Wi-Fi. The Bluetooth (registered trademark) system is applied to multimedia communication and can perform one-to-many connection communication. The ZigBee (registered trademark) uses a physical layer of Institute of Electrical and Electronics Engineers (IEEE) 802.15.4. The IEEE 802.15.4 is a name of a short range wireless network standard referred to as Personal Area Network (PAN) or Wireless (W) PAN.

The control device 9010 is connected to an external server 9013. The server 9013 may be managed by any of the house 9001, the electric power company, and a service provider. The information transmitted and received by the server 9013 is, for example, power consumption information, life pattern information, a power fee, weather information, natural disaster information, and power transaction information. Such information may be transmitted and received by a power consumption device (e.g., a television receiver) in the home, but it may be transmitted and received by a device outside the home (e.g., a mobile phone). The information may be displayed on a device having a display function, such as a television receiver, a mobile phone, or a personal digital assistant (PDA).

The control device 9010 controlling each unit includes a central processing unit (CPU) or a processor, a random access memory (RAM), a read only memory (ROM), and the like, and is housed in the power storage device 9003 in this example. The control device 9010 is connected to the power storage device 9003, the domestic power generation device 9004, the power consumption device 9005, the various sensors 9011, and the server 9013 via the information network 9012, and has a function of regulating, for example, the commercial power consumption and power generation. Note that the control device may include, for example, a function of performing electric power transaction in an electric power market in addition to the above functions.

As described above, not only electric power generated by the centralized power system 9002 (e.g., the thermal power generation 9002a, the nuclear power generation 9002b, and the hydraulic power generation 9002c), but also electric power generated by the domestic power generation device 9004 (e.g., solar power generation and wind power generation) can be stored in the power storage device 9003. Therefore, even when the electric power generated by the domestic power generation device 9004 varies, it is possible to perform control such as maintaining a constant amount of electric power to send outside or discharging a necessary amount of electric power. For example, electric power obtained by solar power generation is stored in the power storage device 9003, low-cost late-night electric power is stored in the power storage device 9003 at night, and the electric power stored by the power storage device 9003 is discharged and utilized in a high-cost time zone in the daytime.

Although the example in which the control device 9010 is housed in the power storage device 9003 has been described, the control device 9010 may be housed in the smart meter 9007 or may be configured independently. Further, the power storage system 9100 may be used for a plurality of homes in collective housing, or may be used for a plurality of detached houses.

An example of the power storage system 9100 to which the technique according to the present disclosure can be applied has been described above. The technique according to the present disclosure can be suitably applied to the secondary battery of the power storage device 9003 in the configuration described above.

EXAMPLES

Although the present disclosure will be described in detail below with reference to Examples, the present disclosure is not limited only to Examples.

Dissolution potential (oxidation-reduction potential) of the metal-containing material and the battery can used in Examples was measured as follows.

Figure 9:
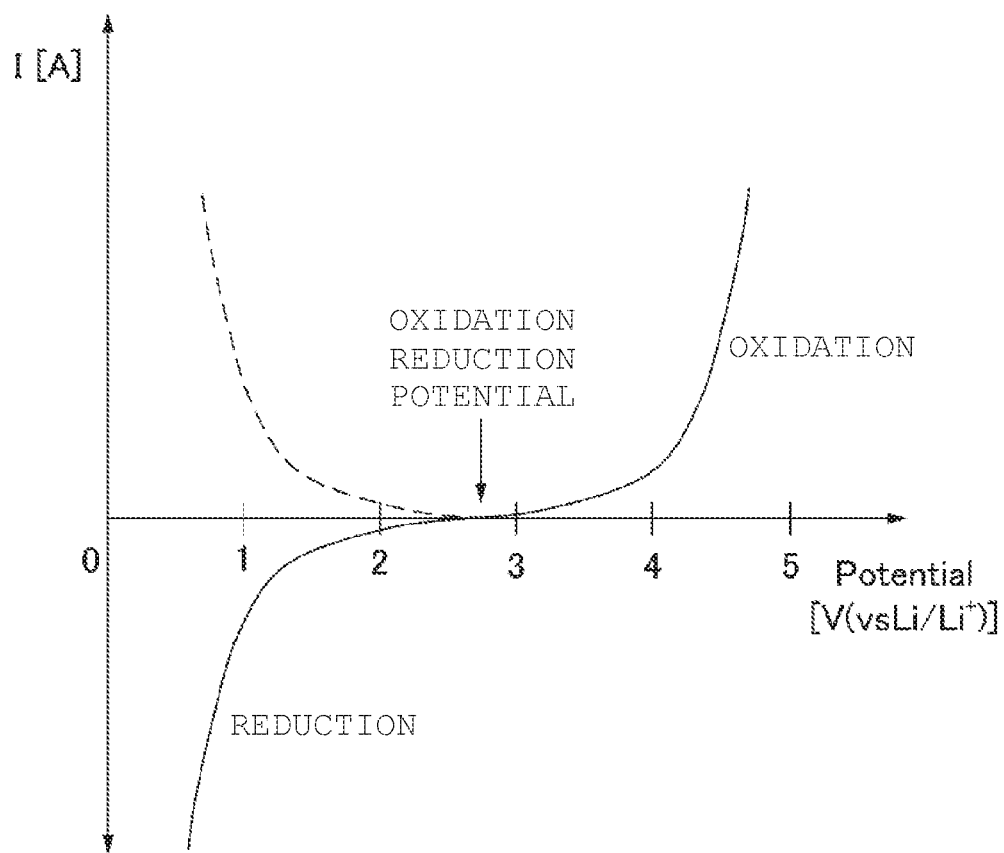
FIG. 9 is a graph for describing a method of measuring dissolution potential according to an embodiment of the present disclosure.

Measuring device: Potentiostat
Reference electrode (RE), counter electrode (GE): Li
Working electrode (WE): Metal-containing materials (zinc, tin, sulfur, silicon, iron, and copper) or inner surface of battery can
Sweep speed: 1 mV/sec
Measuring potential: (1) Oxidation: Higher potential direction from RE (Li) with respect to natural potential (rest potential)
  (2) Reduction: Lower potential direction from RE (Li) with respect to natural potential (rest potential)
Solvent (non-aqueous electrolytic solution): A mixed solvent in which ethylene carbonate (EC) and ethyl methyl carbonate (EMC) are mixed at a volume ratio of 1:3.
  In the above (1) and (2), a current value was stopped at 0.1 MA (/cm2 ).
  A pause of 5 minutes was provided between the above (1) and (2).
  A reduction current was reversed in a positive direction in absolute value display, and a midpoint of the respective curves of a dissolution current and the reduction current was read and used as the oxidation-reduction potential. FIG. 9 is a schematic diagram of the curves of the dissolution current and the reduction current.

Specifically, the oxidation-reduction potential of WE was measured as follows.

Zinc, iron, and copper in a plate shape was regulated to a predetermined electrolytic solution contact area and measured.
Tin and silicon in a lump was put on a glass plate, sandwiched between the glass plate and a platinum plate of a predetermined area, and measured.
Sulfur in a powder form was made into a coating material with polyvinylidene fluoride and N-methylpyrrolidone, applied on copper foil to form an electrode, then peeled off leaving a coating region of a predetermined area, and measured, such that the coating region was equal to the electrolytic solution contact area.
The battery can was measured by injecting a non-aqueous electrolytic solution, such that WE was the inner surface of the battery can, and performing electrochemical measurements with RE and CE inserted in the solution.
WE: inner surface of the battery can
The non-aqueous electrolytic solution was injected up to a level of about 5 mm from an upper end of the battery can, and a WE terminal was connected to the upper end of the battery can that was not in contact with the non-aqueous electrolytic solution.
RE, CE: Li
While RE, CE: Li insulated by a separator was hung from an upper side in the vertical direction, the insulated RE, CE: Li was inserted in the non-aqueous electrolytic solution in the battery can so as to be d in the non-aqueous electrolytic solution, to form an electrode.

Example 1

A positive electrode was manufactured as follows. First, a positive electrode mixture was manufactured by mixing lithium cobalt composite oxide ($LiCoO_2$) as a positive electrode active material, graphite as a conductive agent, and polyvinylidene fluoride (PVdF) as a binding agent. Then, the positive electrode mixture was dispersed in N-methyl-2-pyrrolidone (NMP) as a solvent to obtain a positive electrode mixture slurry in a paste-like form. Next, the positive electrode mixture slurry was applied to both surfaces of a positive electrode current collector made of strip-shaped aluminum foil, dried, then subjected to compression molding by a roll press machine, and slit, thereby manufacturing the positive electrode. Next, the positive electrode lead containing aluminum as a main component was attached by welding to a portion where the positive electrode current collector was exposed from the positive electrode active material layers.

A negative electrode was manufactured as follows. First, a silicon-containing negative electrode active material, a vapor growth carbon fiber (VGCF) as a conductive agent, a carboxymethyl cellulose aqueous solution, and a styrene-butadiene rubber aqueous dispersion were mixed to obtain the negative electrode mixture slurry in a paste-like form. Next, the negative electrode mixture slurry was applied to both surfaces of a negative electrode current collector made of strip-shaped copper foil, dried, then subjected to compression molding by a roll press machine, and slit, thereby manufacturing the negative electrode. Subsequently, a negative electrode lead was attached to a portion where the negative electrode current collector was exposed from the negative electrode active material layers. Note that a copper-nickel clad material was used as the negative electrode lead, and a copper surface of the clad material was attached to the negative electrode current collector.

A non-aqueous electrolytic solution was manufactured as follows. First, ethylene carbonate (EC) and ethyl methyl carbonate (EMC) were mixed at a volume ratio of 1:3 to prepare a mixed solvent. Next, $LiPF_6$ as an electrolyte salt was dissolved in this mixed solvent so as to obtain a concentration of 1 mol/kg (about 1.25 mol/L) to prepare the non-aqueous electrolytic solution.

A battery was assembled as follows. First, the strip-shaped positive and negative electrodes obtained as described above were laminated in the order of the negative electrode, the separator, the positive electrode, and the separator with the strip-shaped separators made of a macroporous polyethylene stretched film interposed therebetween. Thus, a jelly roll type electrode element was obtained by winding the layers a large number of times in a longitudinal direction.

Next, a bottomed can in which a base material containing iron as a main component was plated with nickel was prepared, and a C-shaped groove (thin portion) was formed as a cleavage valve (safety mechanism) on the can bottom. A thickness of a portion of the can other than the groove was about 150 μm, and a thickness of the groove of the battery can was about 50 μm. Further, a disc-shaped zinc plate (oxidation-reduction potential 3.0 V (vsLi/Li$^+$)) having a thickness of 30 μm and having a through-hole in a center as a metal-containing material, and an insulating plate (insulator) having a through-hole in a center were prepared. Then, both of the plates were bonded, such that the centers of the through holes of the plates overlapped each other to obtain a laminated plate.

Subsequently, an insulating plate is disposed at one end of the electrode element, and the laminated plate is disposed at the other end of the electrode element. Then, the electrode element was housed in a battery can, such that the other end side of the electrode element on which the laminated plate was disposed is the can bottom side of the battery can. At this time, as shown in FIG. 1, the negative electrode lead was sandwiched between the metal-containing material and the can bottom, and one end of the negative electrode lead overlapped the through hole of the laminated plate (insulating plate and zinc plate). Next, the welding rod was inserted into a center hole of the electrode element, a tip of the welding rod was inserted into the through hole of the laminated plate, one end of the negative electrode lead (a nickel surface of the clad material) was pressed against the can bottom with the welding rod and welded, and then the positive electrode lead was welded to a safety valve mechanism. Then, a center pin was inserted into the center hole of the electrode element.

After that, grooving (beading) is performed on the open end of the battery can, thereby forming a constriction for crimping the safety valve mechanism, the PTC element, and the battery lid. Next, after the non-aqueous electrolytic solution was injected into the battery can housing the electrode element, the safety valve mechanism, the PTC element, and the battery lid were inserted into the open end of the battery can, and the open end of the battery can was crimped with a sealing gasket interposed therebetween. The zinc plate and the can bottom were pressed against each other by the pressure applied to the electrode element during the crimping. Thus, a battery having a cylindrical shape and ICR18650 size (outer diameter (diameter) 18.20 mm, height 65 mm) was manufactured.

Example 2

A battery was manufactured in the same manner as in Example 1 except that the insulating plate and the zinc plate were not bonded together.

Example 3

As shown in FIG. 4, a battery was manufactured in the same manner as in Example 1 except that the through hole was not provided in the center of the zinc plate, that the negative electrode lead coming out from the other end side of the electrode element was sandwiched between the insulating plate and the zinc plate, and that one end of the negative electrode lead coming out from the other end side of the electrode element was integrally welded by resistance welding to the zinc plate and the can bottom.

Example 4

As shown in FIG. 5, a battery was manufactured in the same manner as in Example 1, except that the through hole was not provided in the center of the zinc plate and that the negative electrode lead was welded to the side surface of the battery can.

Example 5

As shown in FIG. 5, a battery was manufactured in the same manner as in Example 2, except that the through hole was not provided in the center of the zinc plate and that the negative electrode lead was welded to the side surface of the battery can.

Example 6

A battery was manufactured in the same manner as in Example 5 except that the welding rod was inserted into the center hole of the electrode element and the through hole of the insulating plate, and that the zinc plate was welded to the can bottom with the welding rod.

Example 7

A battery was manufactured in the same manner as in Example 1 except that the thickness of the zinc plate was 50 µm.

Example 8

A battery was manufactured in the same manner as in Example 1 except that the thickness of the zinc plate was 100 µm.

Example 9

A battery was manufactured in the same manner as in Example: except that the thickness of the zinc plate was 500 µm.

Example 10

A battery was manufactured in the same manner as in Example 1 except that the thickness of the zinc plate was 1000 µm.

Example 11

A battery was manufactured in the same manner as in Example 1 except that e thickness of the zinc plate was 5000 µm.

Example 12

A battery was manufactured in the same manner as in Example 1 except that the thickness of the zinc plate was 10 µm.

Example 13

A battery was manufactured in the same manner as in Example 1 except that the thickness of the zinc plate was 5 µm.

Example 14

A battery was manufactured in the same manner as in Example 1 except that the thickness of the zinc plate was 1 µm.

Example 15

A battery was manufactured in the same manner as in Example 1, except that a tin plate (oxidation-reduction potential 2.8 V (vsLi/Li$^+$)) was used as the metal-containing material.

Example 16

A battery was manufactured in the same manner as in Example 1 except that a sulfur plate (oxidation-reduction potential 2.5 V (vsLi/Li$^+$)) was used as the metal-containing material.

Example 17

A battery was manufactured in the same manner as in Example 1, except that a silicon plate (oxidation-reduction potential 2.8 V (vsLi/Li$^+$)) was used as the metal-containing material.

Example 18

A battery was manufactured in the same manner as in Example 1 except that a battery can having no C-shaped groove was used as the can bottom.

Comparative Example 1

A battery was manufactured in the same manner as in Example 1 except that an iron plate (oxidation-reduction potential 3.3 V (vsLi/Li$^+$)) was used as the metal-containing material. Although the can base material is also iron, the oxidation-reduction potential (dissolution potential) is 3.25 V (vsLi/Li$^+$), which is a slightly low potential, due to stress during a drawing process or the like, and the iron is different from an iron plate made of pure iron.

Comparative Example 2

A battery was manufactured in the same manner as in Example 1 except that a copper plate (oxidation-reduction potential 3.4 V (vsLi/Li$^+$)) was used as the metal-containing material.

Comparative Example 3

A battery was manufactured in the same manner as in Example 1, except that the zinc plate was not used and the negative electrode lead containing zinc as a main component was used.

The battery obtained as described above was initially charged at a 0.2 ItA charge rate, discharged, and then aged. After that, the following tests were conducted. Here, "ItA" is a value representing a magnitude of a charging current, and is obtained by adding It and a unit of a current to a multiple of the numerical value representing the rated capacity of the battery. For example, 1 ItA is a current value for charge or discharge of an amount of electricity equal to the rated capacity of the battery over one hour.

Test 1: Liquid Leakage Test During Overdischarge with Voltage 0 V

First, the battery was fully charged to 4.2 V, and then discharged at a discharge rate of 0.5 C and a voltage of 2.5 VCut. Next, a 2Ω cement resistor was connected to the battery and stored in a 60° C. thermostatic chamber for 360 days, and the battery voltage and the presence or absence of liquid leakage were evaluated over time. Note that the presence or absence of liquid leakage was confirmed by visual observation. The results are shown in Table 2.

Test 2: Charge and Discharge Test After Overdischarge Liquid Leakage Test with Voltage 0 V First, the battery was fully charged to 4.2 V and then discharged at a discharge rate of 0.5 C and a voltage of 2.5 VCut to obtain a discharge capacity (hereinafter referred to as "discharge capacity before test"). Next, a cement resistor of 2Ω was connected to the battery, stored in a 60° C. thermostatic chamber for 90 days, charged and discharged under the following conditions to obtain the discharge capacity (hereinafter referred to as "discharge capacity after test"). Subsequently, the capacity retention rate before and after the test [%](=((discharge capacity after test)/(discharge capacity before test))×100 ) was calculated. The results are shown in Table 2.

Charge: 0.5 C, 4.2 V CCCV (Constant Current/Constant Voltage) 5 %CmACut
Discharge: 0.5 C, 2.5 VCut CC (Constant Current)

Test 3: Vibration and Shock Resistance Test (Drum Test)

First, the battery was fully charged to 4.2 V, and then discharged at a discharge rate of 0.5 C and a voltage of 2.5 VCut. Next, a 2Ω cement resistor was connected to the battery and stored in a 60° C. thermostatic chamber for 360 days. Subsequently, the battery was put into a commercially available rotating drum tester, rotated for a specified time at a predetermined number of revolutions, and then impedance (resistance) of the battery was measured. Then, the battery in which an increase in the impedance was observed was disassembled and the presence or absence of welding detachment of the negative electrode lead was confirmed. The results are shown in Table 2.

Tables 1 and 2 show the configurations and evaluation results of the batteries according to Examples 1 to 18 and Comparative Examples 1 to 3.

TABLE 1

|  | Groove in can bottom Present/Absent | Material of negative electrode | Welding of can and negative electrode lead Bottom surface/Side surface | Metal-containing material and can bottom (negative electrode) Pressure-welding/Welding | Bonding of insulating plate and metal-containing material Present or absent | Through hole of metal-containing material Present or absent |
|---|---|---|---|---|---|---|
| Example 1 | Present | Cu—Ni clad material | Bottom surface | Pressure-welding | Present | Present |
| Example 2 | Present | Cu—Ni clad material | Bottom surface | Pressure-welding | Absent | Present |
| Example 3 | Present | Cu—Ni clad material | Bottom surface | Welding | Absent | Absent |
| Example 4 | Present | Cu—Ni clad material | Side surface | Pressure-welding | Present | Absent |
| Example 5 | Present | Cu—Ni clad material | Side surface | Pressure-welding | Absent | Absent |

TABLE 1-continued

| | Groove in can bottom Present/ Absent | Material of negative electrode | Welding of can and negative electrode lead Bottom surface/ Side surface | Metal-containing material and can bottom (negative electrode) Pressure-welding/ Welding | Bonding of insulating plate and metal-containing material Present or absent | Through hole of metal-containing material Present or absent |
|---|---|---|---|---|---|---|
| Example 6 | Present | Cu—Ni clad material | Side surface | Welding | Absent | Absent |
| Example 7 | Present | Cu—Ni clad material | Bottom surface | Pressure-welding | Present | Present |
| Example 8 | Present | Cu—Ni clad material | Bottom surface | Pressure-welding | Present | Present |
| Example 9 | Present | Cu—Ni clad material | Bottom surface | Pressure-welding | Present | Present |
| Example 10 | Present | Cu—Ni clad material | Bottom surface | Pressure-welding | Present | Present |
| Example 11 | Present | Cu—Ni clad material | Bottom surface | Pressure-welding | Present | Present |
| Example 12 | Present | Cu—Ni clad material | Bottom surface | Pressure-welding | Present | Present |
| Example 13 | Present | Cu—Ni clad material | Bottom surface | Pressure-welding | Present | Present |
| Example 14 | Present | Cu—Ni clad material | Bottom surface | Pressure-welding | Present | Present |
| Example 15 | Present | Cu—Ni clad material | Bottom surface | Pressure-welding | Present | Present |
| Example 16 | Present | Cu—Ni clad material | Bottom surface | Pressure-welding | Present | Present |
| Example 17 | Present | Cu—Ni clad material | Bottom surface | Pressure-welding | Present | Present |
| Example 18 | Absent | Cu—Ni clad material | Bottom surface | Pressure-welding | Present | Present |
| Comparative Example 1 | Present | Cu—Ni clad material | Bottom surface | Pressure-welding | Present | — |
| Comparative Example 2 | Present | Cu—Ni clad material | Bottom surface | Pressure-welding | Present | — |
| Comparative Example 3 | Present | Zinc | Bottom surface | Pressure-welding | Present | — |

TABLE 2

Dissolution potential of base material of battery can: 3.25 V (vsLi/Li$^+$)

| | Oxidation-reduction potential of metal-containing material (vsLi/Li$^+$) | | | | | | Thickness (μm) | Test 1 Presence or absence of liquid leakage | Test 2 Capacity retention rate [%] | Test 3 Presence or absence of increase in impedance |
|---|---|---|---|---|---|---|---|---|---|---|
| | Zinc (3.0 V) | Tin (2.8 V) | Sulfur (2.5 V) | Silicon (2.8 V) | Iron (3.3 V) | Copper (3.4 V) | | | | |
| Example 1 | Used | — | — | — | — | — | 30 | Absent | 95 | Absent |
| Example 2 | Used | — | — | — | — | — | 30 | Absent | 95 | Absent |
| Example 3 | Used | — | — | — | — | — | 30 | Absent | 96 | Absent |
| Example 4 | Used | — | — | — | — | — | 30 | Absent | 95 | Absent |
| Example 5 | Used | — | — | — | — | — | 30 | Absent | 95 | Absent |
| Example 6 | Used | — | — | — | — | — | 30 | Absent | 96 | Absent |
| Example 7 | Used | — | — | — | — | — | 50 | Absent | 95 | Absent |
| Example 8 | Used | — | — | — | — | — | 100 | Absent | 95 | Absent |
| Example 9 | Used | — | — | — | — | — | 500 | Absent | 96 | Absent |
| Example 10 | Used | — | — | — | — | — | 1000 | Absent | 95 | Absent |
| Example 11 | Used | — | — | — | — | — | 5000 | Absent | 95 | Absent |
| Example 12 | Used | — | — | — | — | — | 10 | Absent | 96 | Absent |
| Example 13 | Used | — | — | — | — | — | 5 | Absent | 93 | Absent |
| Example 14 | Used | — | — | — | — | — | 1 | Absent | 90 | Absent |
| Example 15 | — | Used | — | — | — | — | 30 | Absent | 91 | Absent |
| Example 16 | — | — | Used | — | — | — | 30 | Absent | 93 | Absent |
| Example 17 | — | — | — | Used | — | — | 30 | Absent | 91 | Absent |
| Example 18 | Used | — | — | — | — | — | 30 | Absent | 95 | Absent |
| Comparative Example 1 | — | — | — | — | Used | — | 30 | Present | 75 | Present (Detachment of negative electrode lead present) |

TABLE 2-continued

Dissolution potential of base material of battery can: 3.25 V (vsLi/Li+)

| | Oxidation-reduction potential of metal-containing material (vsLi/Li+) | | | | | | Test 1 Presence or absence of liquid leakage | Test 2 Capacity retention rate [%] | Test 3 Presence or absence of increase in impedance |
|---|---|---|---|---|---|---|---|---|---|
| | Zinc (3.0 V) | Tin (2.8 V) | Sulfur (2.5 V) | Silicon (2.8 V) | Iron (3.3 V) | Copper (3.4 V) | Thickness (μm) | | |
| Comparative Example 2 | — | — | — | — | — | Used | 30 | Present | 75 | Present (Detachment of negative electrode lead present) |
| Comparative Example 3 | — | — | — | — | — | — | | Absent | 73 | Present (Detachment of negative electrode lead present) |

The results of the above tests 1 to 3 reveal the following.

In the batteries (Examples 1 to 17) using a zinc plate, a tin plate, a sulfur plate, a silicon plate, an iron plate, or a copper plate as a metal-containing material (i.e., a metal-containing material having the oxidation-reduction potential as low as less than 3.25 V (vsLi/Li+) that is the dissolution potential of the battery can, and the oxidation-reduction potential as high as 1.5 V (vsLi/Li+) or higher that is considered to be substantially the highest potential at the time of negative electrode discharge), the following effects can be obtained. That is, the occurrence of liquid leakage when the battery is overdischarge to a voltage of about 0 V can be suppressed, and deterioration of the battery characteristics during charge and discharge after the overdischarge (decrease in the capacity retention rate and increase in the impedance (detachment of the welded negative electrode lead)) can be suppressed.

On the other hand, with a battery using a steel plate or a copper plate as a metal-containing material (i.e., a metal-containing material having high potential equal to or higher than 3.25 V (vsLi/Li+) where the oxidation-reduction potential is the dissolution potential of the battery can) (Comparative Examples 1 and 2), liquid leakage of the battery can occurs when the battery is overdischarged to a voltage of about 0 V. Further, the battery characteristics are deteriorated during the charge and discharge after the overdischarge.

In the battery using the negative electrode lead containing zinc as a main component (Comparative Example 3), when the battery is overdischarged to a voltage of about 0 V, liquid leakage of the battery can be suppressed. However, a deterioration of the battery characteristics, that is, a decrease in the capacity retention rate and an increase in the impedance (detachment of the welded negative electrode lead) are observed during the charge and discharge after the overdischarge. The decrease in the capacity retention rate is considered to be attributed to the dissolution and diffusion of the entire negative electrode lead, resulting in a decrease in the reaction area of the negative electrode due to the charge after the overdischarge, or the occurrence of a micro short circuit at the end of the negative electrode facing the positive electrode. The increase in the impedance is considered to be due to the dissolving of the welded portion of the negative electrode lead and the can bottom and the welded portion of the negative electrode lead and the negative electrode current collector.

The capacity retention rate of the battery using the zinc plate as the metal-containing material (Example 1) is higher than the capacity retention rate of the battery using the tin plate, sulfur plate, or silicon plate as the metal-containing material (Examples 15 to 17). Therefore, it is preferable to use the zinc plate as the metal-containing material from a viewpoint of suppressing a decrease in the capacity retention rate during charge and discharge after the overdischarge.

Evaluation results of tests 1 to 3 of the battery having the C-shaped groove on the can bottom (Example 1) are similar to the results of tests 1 to 3 of the battery having no C-shaped groove on the can bottom (Example 18). Therefore, even with a configuration in which a C-shaped groove is provided on the can bottom, the configuration highly possibly causing liquid leakage in a general battery, favorable effects can be obtained by providing a metal-containing material between the insulating plate and the can bottom.

In the batteries in which the thickness of the metal-containing material in a plate shape is in a range of 1 μm or more and 5000 μm or less (Examples 1 to 14), favorable effects are obtained regarding the suppression of a decrease in the capacity retention rate. In the batteries in which the thickness of the metal-containing material in a plate shape is in a range of 5 μm or more and 5000 μm or less (Examples 1 to 13), more favorable effects are obtained regarding the suppression of a decrease in the capacity retention rate. In the batteries in which the thickness of the metal-containing material in a plate shape is in a range of 10 μm or more and 5000 μm or less (Examples 1 to 12), particularly favorable effects are obtained regarding the suppression of a decrease in the capacity retention rate. Therefore, from the viewpoint of suppressing a decrease in the capacity retention rate in charge and discharge after the overdischarge, the thickness of the metal-containing material in a plate shape is preferably 1 μm or more and 5000 μm or less, more preferably 5 μm or more and 500 μm or less, and even more preferably 10 μm or more and 5000 μm or less.

There is no difference in the battery characteristics depending on whether the insulating plate and the metal-containing material in a plate shape are bonded to each other in advance. However, when the insulating plate and the metal-containing material in a plate shape are bonded to each other in advance to form a laminated plate, battery productivity can be improved. Therefore, the insulating plate and the plate-shaped metal-containing material are preferably bonded to each other in advance.

Although the embodiments and the examples of the present disclosure have been described specifically, the present disclosure is not limited to the embodiments and the examples, and various modifications based on the technical idea of the present disclosure can be made.

For example, the configurations, methods, steps, shapes, materials, numerical values, and the like mentioned in the above embodiments, the modified examples of the embodiments, and the examples are merely examples, and different configurations, methods, steps, shapes, materials, numerical values, and the like may be used, if necessary. Further, the chemical formulae of the compounds and the like are representative, and a generic name of a compound is not limited by the valences or the like.

Further, the configurations, methods, steps, shapes, materials, numerical values, and the like of the above-described embodiments, the modified examples of the embodiments, and the examples can be combined with each other without departing from the gist of the present disclosure.

Further, the present disclosure is described below in further detail according to an embodiment:

(1)
A battery including:
a bottomed can that includes a base material containing iron and a nickel layer provided on a surface of the base material;
an electrode element housed in the can;
an insulating plate provided between the electrode element and a bottom of the can; and
a metal-containing material provided between the insulating plate and the bottom of the can,
in which an oxidation-reduction potential of the metal-containing material in a non-aqueous electrolytic solution is 1.5 V (vsLi/Li$^+$) or higher and lower than 3.25 V (vsLi/Li$^+$).

(2)
The battery according to (1), in which the metal-containing material includes at least one of zinc, tin, silicon, and sulfur.

(3)
The battery according to (1), in which the metal-containing material includes zinc.

(4)
The battery according to any one of (1) to (3), in which the metal-containing material is bonded to the insulating plate.

(5)
The battery according to any one of (1) to (4), in which the metal-containing material has a thickness of 1 µm or more and 5000 µm or less.

(6)
The battery according to any one of (1) to (5), in which the bottom of the can and the metal-containing material are pressure-welded or welded to each other.

(7)
The battery according to any one of (1) to (6), in which the metal-containing material has a plate shape, a foil shape, a thin film shape, a mesh shape, a block shape, or a powder form.

(8)
The battery according to any one of (1) to (7), in which the metal-containing material is not a negative electrode lead.

(9)
The battery according to any one of (1) to (8), further including a negative electrode lead that connects a negative electrode included in the electrode element and the can, in which the negative electrode lead includes at least one of nickel, copper, a nickel alloy, and a copper alloy.

(10)
The battery according to (9), in which the negative electrode lead is a plating material or a clad material.

(11)
The battery according to any one of (1) to (10), in which a groove is provided on the bottom of the can.

(12)
A battery pack including the battery according to any one of (1) to (11).

(13)
An electronic device including the battery according to any one of (1) to (11),
in which the electronic device receives electric power supply from the battery.

(14)
An electric vehicle including:
the battery according to any one of (1) to (11); and
a converter that receives electric power supply from the battery and converts the electric power into a driving force of the vehicle.

(15)
The electric vehicle according to (14), further including a control device that performs information processing related to vehicle control based on information related to the battery.

(16)
A power storage device including the battery according to any one of (1) to (11),
in which the power storage device supplies electric power to an electronic device connected to the battery.

(17)
The power storage device according to (16), including a power information control device that transmits and receives a signal to and from another device via a network,
in which the power storage device controls charging and discharging of the battery, based on information received by the power information control device.

(18)
An electric power system where electric power is supplied from the battery according to any one of (1) to (11), or electric power is supplied to the battery from a power generation device or an electric power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
a can that includes a base material including iron and a nickel layer provided on a surface of the base material;
an electrode element accommodated in the can;
an insulating plate provided between the electrode element and a bottom of the can; and
a metal-containing material only provided between the insulating plate and the bottom of the can,
wherein an oxidation-reduction potential of the metal-containing material in a non-aqueous electrolytic solution is 1.5 V (vsLi/Li$^+$) or higher and lower than 3.25 V (vsLi/Li$^+$).

2. The battery according to claim 1, wherein the metal-containing material includes one or more of zinc, tin, silicon, and sulfur.

3. The battery according to claim 1, wherein the metal-containing material includes zinc.

4. The battery according to claim 1, wherein the metal-containing material is configured to be bonded to the insulating plate.

5. The battery according to claim 1, wherein the metal-containing material has a thickness of 1 μm or more and 5000 μm or less.

6. The battery according to claim 1, wherein the bottom of the can and the metal-containing material are pressure-welded or welded to each other.

7. The battery according to claim 1, wherein the metal-containing material has a plate shape, a foil shape, a thin film shape, a mesh shape, a block shape, or a powder form.

8. The battery according to claim 1, wherein the metal-containing material is not a negative electrode lead.

9. The battery according to claim 1, further comprising a negative electrode lead configured to connect a negative electrode included in the electrode element and the can,
wherein the negative electrode lead includes one or more of nickel, copper, a nickel alloy, and a copper alloy.

10. The battery according to claim 9, wherein the negative electrode lead is a plating material or a clad material.

11. The battery according to claim 1, wherein a groove is provided at the bottom of the can.

12. A battery pack comprising the battery according to claim 1.

13. An electronic device comprising the battery according to claim 1, wherein the electronic device is configured to receive electric power supply from the battery.

14. An electric vehicle comprising:
the battery according to claim 1; and
a converter is configured to receive electric power supply from the battery and convert the electric power into a driving force of the electric vehicle.

15. The electric vehicle according to claim 14, further comprising a controller configured to perform information processing related to vehicle control based on information related to the battery.

16. A power storage device comprising the battery according to claim 1, wherein the power storage device is configured to supply electric power to an electronic device connected to the battery.

17. The power storage device according to claim 16, comprising a power information control device configured to transmit and receive a signal to and from another device via a network, wherein the power storage device is configured to control charging and discharging of the battery, based on information received by the power information control device.

18. An electric power system wherein electric power is configured to be supplied from the battery according to claim 1, or electric power is configured to be supplied to the battery from a power generation device or an electric power network.

19. The battery according to claim 1, wherein the metal-containing material includes a through hole.

20. The battery according to claim 1, further comprising a negative electrode lead, wherein the negative electrode lead is provided between the metal-containing material and the bottom of the can.

* * * * *